(12) United States Patent
Volkerink et al.

(10) Patent No.: US 11,657,250 B2
(45) Date of Patent: May 23, 2023

(54) WIRELESS SENSOR NETWORKS INSTALLATION, DEPLOYMENT, MAINTENANCE, AND OPERATION

(71) Applicant: Trackonomy Systems, Inc., San Jose, CA (US)

(72) Inventors: Hendrik J Volkerink, Palo Alto, CA (US); Ajay Khoche, West San Jose, CA (US); Scott Filler, Santa Clara, CA (US)

(*) Notice: Subject to any disclaimer, the term of this patent is extended or adjusted under 35 U.S.C. 154(b) by 0 days.

(21) Appl. No.: 17/671,518

(22) Filed: Feb. 14, 2022

(65) Prior Publication Data

US 2022/0309313 A1    Sep. 29, 2022

Related U.S. Application Data

(63) Continuation of application No. 16/857,177, filed on Apr. 24, 2020, now Pat. No. 11,281,958, which is a
(Continued)

(51) Int. Cl.
*G06K 19/077* (2006.01)
*G06K 19/06* (2006.01)
(Continued)

(52) U.S. Cl.
CPC ........ *G06K 19/07773* (2013.01); *B32B 37/06* (2013.01); *B32B 37/12* (2013.01);
(Continued)

(58) Field of Classification Search
CPC ....... G06K 19/07773; G06K 19/06037; G06K 19/0702; B32B 37/06; B32B 37/12;
(Continued)

(56) References Cited

U.S. PATENT DOCUMENTS

| 10,244,348 | B2* | 3/2019 | Kostka ..... | H04W 4/30 |
| 11,281,958 | B2* | 3/2022 | Volkerink ..... | B32B 37/06 |
| 2010/0201520 | A1 | 8/2010 | Stern et al. | |

OTHER PUBLICATIONS

Partial Supplementary European Search Report for European Patent Application No. 20794790.4 dated Dec. 5, 2022, 15 pages.

* cited by examiner

*Primary Examiner* — Seung H Lee

(57) ABSTRACT

The present disclosure relates to wireless sensor networks installation, deployment, maintenance, and operation. A distributed network of wireless tags enable a wide variety of different indoor and outdoor applications to be implemented, including asset finding, workflow automation, and internet-of-things applications. The physical premises environment may be any location in which there are persons, places or things to be monitored, tracked, sensed, or inventoried, or other defined space. The distributed network of wireless tags is associated with a wireless client device that enables a customer to configure and retrieve status data, event data, and sensor data from wireless tags and other components in the physical premises environment. Embodiments utilize different types of network nodes to collect data from the physical premises environment. Examples of the types of data that may be collected by the wireless tags include asset status information, event data, and sensor data.

20 Claims, 17 Drawing Sheets

Related U.S. Application Data continuation-in-part of application No. 16/581,599, filed on Sep. 24, 2019, now Pat. No. 11,328,201, and a continuation-in-part of application No. 16/383,353, filed on Apr. 12, 2019, now Pat. No. 10,872,286, which is a continuation of application No. 15/842,867, filed on Dec. 14, 2017, now Pat. No. 10,445,634, which is a continuation of application No. 15/842,861, filed on Dec. 14, 2017, now Pat. No. 10,262,255.

(60) Provisional application No. 62/851,231, filed on May 22, 2019, provisional application No. 62/846,384, filed on May 10, 2019, provisional application No. 62/838,940, filed on Apr. 25, 2019, provisional application No. 62/435,207, filed on Dec. 16, 2016, provisional application No. 62/434,218, filed on Dec. 14, 2016.

(51) Int. Cl.

| | |
|---|---|
| *G06K 19/07* | (2006.01) |
| *H04W 4/029* | (2018.01) |
| *C09J 7/38* | (2018.01) |
| *B32B 37/06* | (2006.01) |
| *B32B 37/12* | (2006.01) |
| *H04W 4/02* | (2018.01) |

(52) U.S. Cl.
CPC .......... *C09J 7/38* (2018.01); *G06K 19/06037* (2013.01); *G06K 19/0702* (2013.01); *H04W 4/029* (2018.02); *B32B 2457/00* (2013.01); *C09J 2203/326* (2013.01); *C09J 2301/124* (2020.08); *C09J 2301/302* (2020.08); *C09J 2301/40* (2020.08); *C09J 2463/00* (2013.01); *H04W 4/027* (2013.01)

(58) Field of Classification Search
CPC ... B32B 2457/00; C09J 7/38; C09J 2203/326; C09J 2301/124; C09J 2301/302; C09J 2301/40; C09J 2463/00; H04W 4/029; H04W 4/027; H04W 4/38; H04W 4/80; H04W 4/33
See application file for complete search history.

| Symbol | Object Type |
|---|---|
| 72 ● | Infrastructure Beacon (white) |
| 74 Ⓐ | Asset Beacon (white) |
| 76 △S△ | Scanner (green)  ← 71 |
| 78 [R] | Relay (black) |
| 80 △!△ | Sensor (white) |
| ⌐ | Door |
| 👤 | Person |
| 🪑 | Chair |

| Symbol | Object Type |
|---|---|
| ● | Infrastructure Beacon (white) |
| Ⓐ | Asset Beacon (white) |
| △S | Scanner (green) |
| ☐R | Relay (black) |
| △! | Sensor (white) |
| ⌒ | Door |
| 👤 | Person |
| ⌒ | Chair |

Coverage:
35%

Map Cost:
$5,000

Battery Life:
12m, 3d

WIRELESS SENSOR NETWORKS INSTALLATION, DEPLOYMENT, MAINTENANCE, AND OPERATION

CROSS-REFERENCE TO RELATED APPLICATIONS

This application is a continuation of pending U.S. patent application Ser. No. 16/857,177, filed on Apr. 24, 2020, which is incorporated herein in its entirety.

BACKGROUND

The present disclosure relates to wireless sensor networks installation, deployment, maintenance, and operation.

DETAILED DESCRIPTION

Introduction

Figure 1A:
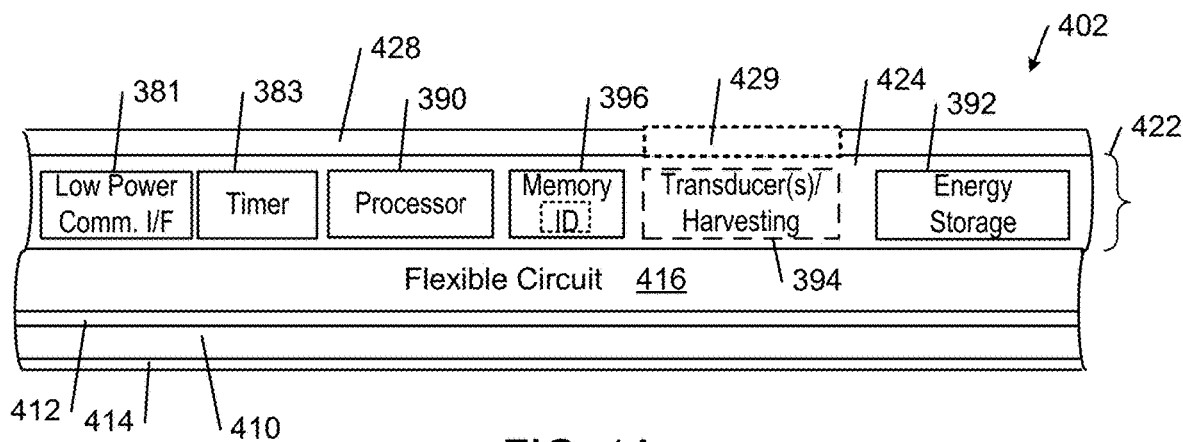
FIGS. 1A-1C show diagrammatic cross-sectional side views of portions of different respective adhesive tape platforms.

Embodiments disclosed herein include a wireless infrastructure deployment and management system for intuitively guiding a person through a process of deploying, operating, and maintaining wireless tags (e.g., Bluetooth Low Energy tags) that are associated with infrastructure and movable items and persons within an environment (e.g., an office building, manufacturing plant, storage facility, a parking lot, a construction site, or other indoor or outdoor locations) to enable a variety of different applications, including asset and person tracking, navigation, and workflow automation.

A "wireless tag" is a device that has wireless communications functionality, and typically includes an energy source or energy harvesting component, a processor, a memory, and zero or more sensors. A wireless tag may have any one of a variety of different form factors, including a rigid and/or flexible form factor. In some examples, a wireless tag includes means of attaching the wireless tag to an object or surface. Example means of attachment include a pressure sensitive adhesive and a magnet.

In some examples, a wireless tag is implemented with a form factor that unobtrusively integrates the components useful for implementing one or more different functions and also is able to perform a useful ancillary function that otherwise would have to be performed with the attendant need for additional materials, labor, and expense. In some embodiments, the wireless tag is implemented as an adhesive product that integrates wireless communications and sensing components within a flexible adhesive structure in a way that not only provides a cost-effective platform for wirelessly interconnecting, optimizing, and protecting the components of the tracking system but also maintains the flexibility needed to function as an adhesive product that can be deployed seamlessly into a wide variety of applications and workflows, including person and object tracking applications, and asset management workflows such as manufacturing, storage, shipping, delivery, and other industrial IOT applications associated with moving products and other physical objects, including sensing, tracking, locationing, warehousing, parking, safety, construction, event detection, road management and infrastructure, security, healthcare, and other applications. In some examples, the adhesive tape platforms are used in various aspects of logistics management, including sealing parcels, transporting parcels, tracking parcels, monitoring the conditions of parcels, inventorying parcels, and verifying package security. In these examples, the sealed parcels typically are transported from one location to another by truck, train, ship, or aircraft or within premises, e.g., warehouses by forklift, trolleys etc.

In disclosed examples, a wireless tag includes a plurality of segments that can be separated from one another (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Once deployed, each wireless tag can function, for example, as an adhesive tape, label, sticker, decal, or the like, and as a wireless communications device.

FIG. 1A shows a cross-sectional side view of a portion of an example segment 402 of a wireless tag in the form of a flexible adhesive tape platform that includes a respective set of the components of the wireless transducing circuit corresponding to the first tape node type (i.e., white; referred to herein as a "peripheral tape node"). The flexible adhesive tape platform segment 402 includes an adhesive layer 412, an optional flexible substrate 410, and an optional adhesive layer 414 on the bottom surface of the flexible substrate 410. If the bottom adhesive layer 414 is present, a release liner (not shown) may be (weakly) adhered to the bottom surface of the adhesive layer 414. In some examples, the adhesive layer 414 includes an adhesive (e.g., an acrylic foam adhesive) that has a high bond strength that is sufficient to prevent removal of the adhesive segment 402 from a surface on which the adhesive layer 414 is adhered without destroying the physical or mechanical integrity of the adhesive segment 402 and/or one or more of its constituent components. In some examples, the optional flexible substrate 410 is implemented as a prefabricated adhesive tape that includes the adhesive layers 412, 414 and the optional release liner. In other examples, the adhesive layers 412, 414 are applied to the top and bottom surfaces of the flexible substrate 410 during the fabrication of the adhesive tape platform. The adhesive layer 412 bonds the flexible substrate 410 to a bottom surface of a flexible circuit 416, that includes one or more wiring layers (not shown) that connect the processor 390, a low power wireless communications interface 381 (e.g., a Bluetooth® Low Energy (BLE) interface, a Zigbee interface, or other low power wireless communications interface), a timer circuit 383, transducing and/or energy harvesting component(s) 394 (if present), the memory 396, and other components in a device layer 422 to each other and to the energy storage component 92 and, thereby, enable the transducing, tracking and other functionalities of the flexible adhesive tape platform segment 402. The low power wireless communications interface 81 typically includes one or more of the antennas 384, 388 and one or more of the wireless circuits 382, 386.

Figure 1B:
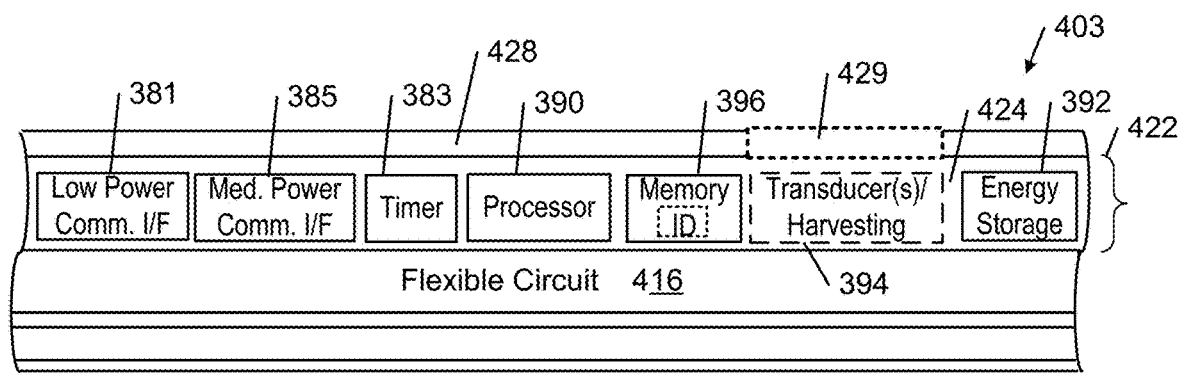

FIG. 1B shows a cross-sectional side view of a portion of an example segment 403 of a wireless tag in the form of a flexible adhesive tape platform that includes a respective set of the components of the wireless transducing circuit 406 corresponding to the second tape node type (i.e., green; referred to herein as an "intermediate tape node"). In this example, the flexible adhesive tape platform segment 403 differs from the segment 402 shown in FIG. 1A by the inclusion of a medium power communications interface 385 (e.g., a LoRaWAN interface) in addition to the low power communications interface that is present in the first tape node type (i.e., white). The medium power communications interface has longer communication range than the low power communications interface. In some examples, one or more other components of the flexible adhesive tape platform segment 403 differ, for example, in functionality or capacity (e.g., higher capacity energy source).

Figure 1C:
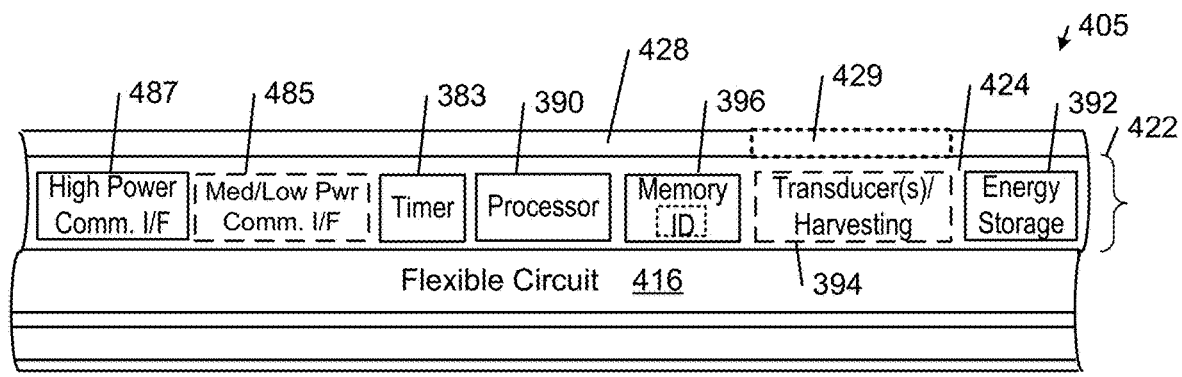

FIG. 1C shows a cross-sectional side view of a portion of an example segment 405 of a wireless tag in the form of a flexible adhesive tape platform that includes a respective set of the components of the wireless transducing circuit 406 corresponding to the third tape node type (i.e., black; referred to herein as a "master tape node"). In this example, the flexible adhesive tape platform segment 405 includes a high power communications interface 487 (e.g., a cellular interface; e.g., GSM/GPRS) and an optional medium and/or low power communications interface 485. The high power communication range provides global coverage to available infrastructure (e.g. the cellular network). In some examples, one or more other components of the flexible adhesive tape platform segment 405 differ, for example, in functionality or capacity (e.g., higher capacity energy source).

FIGS. 1A-1C show examples in which the cover layer 428 of the flexible adhesive tape platform includes one or more optional interfacial regions 429 positioned over one or more of the transducers 394. In examples, one or more of the interfacial regions 429 have features, properties, compositions, dimensions, and/or characteristics that are designed to improve the operating performance of the platform for specific applications. In some examples, the flexible adhesive tape platform includes multiple interfacial regions 429 over respective transducers 394, which may be the same or different depending on the target applications. Example interfacial regions include an opening, an optically transparent window, and/or a membrane located in the interfacial region 429 of the cover 428 that is positioned over the one or more transducers and/or energy harvesting components 394. Additional details regarding the structure and operation of example interfacial regions 129 are described in U.S. Provisional Patent Application No. 62/680,716, filed Jun. 5, 2018, and U.S. Provisional Patent Application No. 62/670,712, filed May 11, 2018, the entire contents of which are incorporated herein by reference.

In some examples, a flexible polymer layer 424 encapsulates the device layer 422 and thereby reduces the risk of damage that may result from the intrusion of contaminants and/or liquids (e.g., water) into the device layer 422. The flexible polymer layer 424 also planarizes the device layer 422. This facilitates optional stacking of additional layers on the device layer 422 and also distributes forces generated in, on, or across the adhesive tape platform segment 402 so as to reduce potentially damaging asymmetric stresses that might be caused by the application of bending, torqueing, pressing, or other forces that may be applied to the flexible adhesive tape platform segment 402 during use. In the illustrated example, a flexible cover 428 is bonded to the planarizing polymer 424 by an adhesive layer (not shown).

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Exemplary Embodiments

Figure 2:
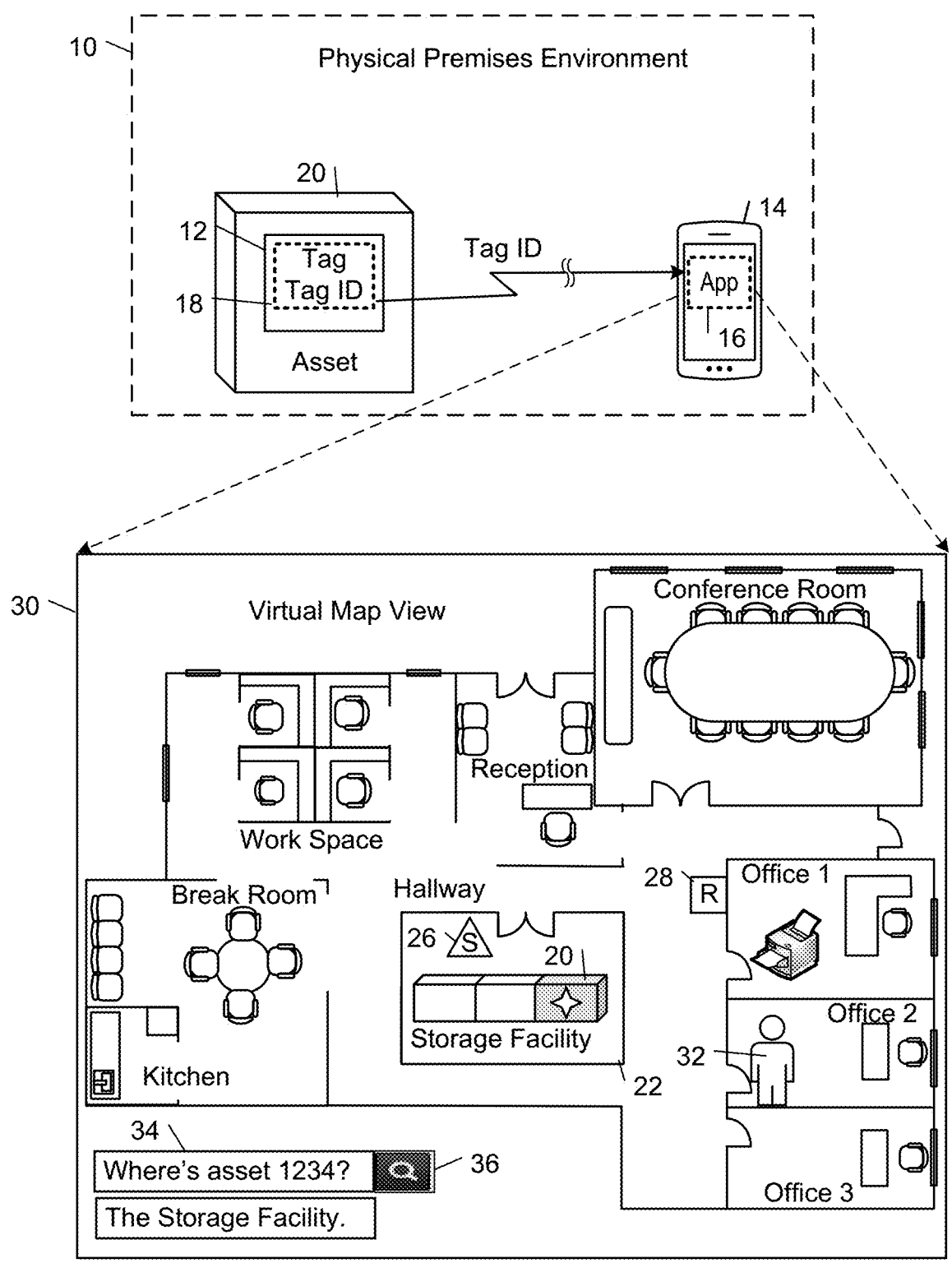
FIG. 2 is a diagrammatic view of an example of a physical premises environment containing an asset communicating with a wireless computing device displaying a virtual map view of the physical premises environment.

Introduction:

FIG. 2 shows an example of a physical premises environment 10 that includes a distributed network of wireless tags 12 (also referred to as "network nodes") that enable a wide variety of different indoor and outdoor applications to be implemented, including, for example, asset finding, workflow automation, and internet-of-things applications. The physical premises environment 10 may be, for example, any location in which there are persons, places or things to be monitored, tracked, sensed, or inventoried, including a building, a port, a warehouse, a distribution center, a manufacturing establishment, a supplier establishment, a customer establishment, a retail establishment, a restaurant, an apartment building, a hotel, a house, or other dwelling or defined space.

The distributed network of wireless tags 12 is associated with a wireless client device 14 (e.g., a wireless mobile computing device, such as a smart phone, a tablet computer, or a laptop computer) that enables a customer to configure and retrieve status data, event data, and sensor data from wireless tags 12 and other components in the physical premises environment 10. The disclosed embodiments utilize different types of network nodes to collect data from the physical premises environment 10, including master network nodes, intermediate network nodes, and peripheral network nodes. Examples of the types of data that may be collected by the wireless tags include asset status information (e.g., tag identity, tag type, and associated parameter values, such as location name or location description), event data (e.g., a door or window is open, an air conditioning unit is set too low, a water pipe is leaking, and a 3D printer is being moved), and sensor data (e.g., temperature data, acceleration data, humidity, location data, etc.). In the example shown in FIG. 2, a user can install a client application 16 on the wireless client device 14 to obtain information from the distributed network of wireless tags regarding, for example, the status, condition, or state of the infrastructure and assets in the physical premises environment 10, as well as information concerning assets and other items in the physical premises environment 10.

In general, the distributed network of wireless tags 12 in the physical premises environment 10 can be implemented by a wide variety of different wireless tag types. For example, in some embodiments, the distributed network of wireless tags 12 includes various types of tape nodes deployed in the physical premises environment 10, including a peripheral tape node 402 (shown in FIG. 1A, referred to herein as the "white" tape node 402), an intermediate tape node (shown in FIG. 1B, referred to herein as the "green" tape node 403), and a master tape node 405 (shown in FIG. 1C, referred to herein as the "black" tape node 405).

In some examples, multiple classes or types of tape nodes are used to implement a particular use model, where each tape node class has a different respective set of roles, functionalities, and/or capabilities. In general, the peripheral, intermediate, and master tape nodes 402, 403, and 405 may be associated with any person, place, or thing. In some examples, the tape nodes are deployed in the physical premises environment 10 at various locations, including on physical infrastructure (e.g., walls, doors, and windows) and on transient assets (e.g., equipment, parcels, and people). In some examples, the various tape nodes in the physical premises environment 10 communicate over local channels implemented using low-power wireless communications interfaces, such as a Bluetooth communication interface (e.g., a Bluetooth Low Energy (BLE) interface), a Z-wave communication interface, and a ZigBee communication interface.

As explained in detail below, during installation of a wireless tag 12, the user operates the wireless client device 14 to associate a unique identifier stored in the wireless tag 12 (referred to herein as a "wireless tag ID") with the corresponding location of the wireless tag in a virtual map of the physical premises environment 10. In this process, the client application 16 scans the wireless tag ID 18 stored in the wireless tag 12 and associates the wireless tag ID 18 with the virtual map location that corresponds to the location where the wireless tag 12 is installed in the physical premises environment 10. The wireless client device 14 executes the client application 16 to associate the wireless tag ID to a designated map location and store that association in a memory component of the wireless client device 14 or other data storage location.

As explained in detail below, the wireless tags 12 are distributed in the physical premises environment 10 to provide wireless network coverage across designated zones of the physical premises environment 10. In this process, a variety of different types of wireless tags are distributed in the designated zones, including infrastructure beacon tags, asset beacon tags, scanner tags, relay tags, and sensor tags. The infrastructure beacon tags are typically implemented by white wireless tags (i.e., peripheral tags) that are installed on physical infrastructure (e.g., walls) in designated zones (e.g., rooms, hallways, and other fixed structures or defined places) within the physical premises environment 10 to transmit their respective IDs in beacon packets from respective mapped infrastructure locations in the physical premises environment 10. The asset beacon tags typically are implemented by white wireless tags (i.e., peripheral tags) that are installed on movable or transient assets (e.g., boxes, equipment, etc.) that transmit their respective IDs in beacon packets from variable locations within the physical premises environment 10. The scanner tags are typically implemented by a green wireless tags (i.e., intermediate tags) that are installed on physical infrastructure (e.g., walls) in larger defined areas of the physical premises environment 10 to scan for the IDs of, for example, asset beacons that are dispersed over a larger physical area. The relay tags are typically implemented by black (i.e., master) tape node that are installed on physical infrastructure (e.g., hallway walls) to provide network coverage in areas of the physical premises environment 10 that lack coverage. The sensor tags are typically installed to provide sensing functionality for implementing a wide variety of applications and use models. For example, sensor tags may be deployed on walls, doors, windows, assets (e.g., valuable assets, such as equipment) to measure a wide variety of physical parameters (e.g., temperature, pressure, acceleration, moisture, etc.) and detect a wide range of events (e.g., a door or window is open, an air conditioning unit is set too low, a water pipe is leaking, and a 3D printer is being moved).

In some examples, the distributed network of wireless tags 12 in the physical premises environment 10 leverages the above-mentioned communications technologies (e.g., the peripheral, intermediate, and master tape node types 102, 103, 105; FIGS. 1A-1C) to create a hierarchical wireless network of tape nodes that improves asset management operations by reducing costs and increasing efficiencies in a wide range of processes, from asset packaging, asset transporting, asset tracking, asset state or condition monitoring, asset inventorying, and asset security verification. Communication across the network communications environment 10 is secured by a variety of different security mechanisms. In the case of existing infrastructure, a communication link uses existing infrastructure security mechanisms. In the case of communications among tapes nodes, communication is secured through a custom security mechanism. In certain cases, tape nodes can also be configured to support block chain based security measures that protect the transmitted and stored data.

In the embodiment shown in FIG. 2, the wireless tag 12 is implemented by a white (i.e., peripheral) tape node in the form of a label on an asset 20 (i.e., a box). The wireless tag 12 includes a memory that stores a unique identifier 18 of the wireless tag 12 (e.g., a tag ID). In an example use case, the wireless tag 12 is configured (e.g., by firmware) to operate as an asset beacon that transmits advertisement packets containing the tag ID 18 and optionally other information (e.g., tag type, asset description, etc.).

As explained below, in some examples, the wireless tags that are deployed in the physical premises environment 10 share data with each other, including the detected locations of assets, so that over a period of time some or all of the wireless tags will have the same set of information. In an example, the wireless asset tag 12 that is attached to an asset 20 in the storage facility 22 may transmit advertisement packets associated with the wireless tag ID 18 to a scanner tag 26 that, in turn, transmits advertisement packets containing the wireless tag ID 18 to a relay tag 28, and so on until all nodes in the physical premises environment 10, or a designated subset of the nodes (e.g., relay nodes), stores a record that associates the location of the wireless tag with the ID of the wireless tag 12. The user may then enter the tag ID 18 into the client application 16 to identify the location of the asset 20 in a virtual map view interface 30 that corresponds to the location of the physical asset 20 in the physical premises environment 10.

In an example locationing application, the user 32 inputs one or more search terms into the client application 16. The user may input one or more keywords or natural language input, for example, in the form of typed text or voice input. In the illustrated example, the user enters the wireless tag ID 18 of the asset 20. In some examples, the user enters inputs through an auxiliary interface, such as a wireless scanner or an optical scanner. In the illustrated example, the virtual map view interface 22 includes a search box 34 in which the user has entered the input "Where's asset 1234?" In response to the user's selection of a search button 36, the client application 16 transmits to the relay 28 a request for the current location of the asset 20. In response to the request, the relay 28 transmits advertising packets with the wireless tag ID 18 of the asset 20. In this example, a wireless scanner tag 26 receives the advertising packets from the relay 28. The wireless scanner tag 26 is located within the storage facility 22 and stores the wireless tag IDs of the assets within the storage facility. In response to receipt of a wireless packet with the asset tag ID 18, the wireless scanner tag 26 compares the asset tag ID received from the relay 28 with the tag IDs stored in the scanner's memory. Based on a match between the received asset tag ID 18 and the asset tag ID received from the relay, the scanner 26 establishes a wireless connection with the relay 28 and transmits one or more packets that contains the name and/or description of the location of the wireless tag ID (e.g., "The Storage Facility"). In the illustrated embodiment, in addition to providing the name of the location of the target asset, the virtual map view additionally highlights the location of the asset 20 within the storage facility 22.

Wireless Tag Network Installation:

Embodiments disclosed herein include an intuitive wireless infrastructure deployment system, method, and interface for guiding a person through a process of deploying wireless tags (e.g., Bluetooth Low Energy (BLE) tags) that are associated with, for example, infrastructure, movable items and other assets, and persons within a physical premises environment 10.

Figure 3:
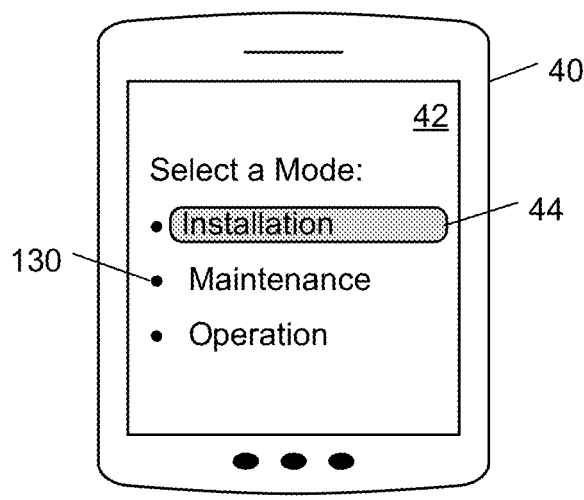
FIG. 3 is a diagrammatic view of a wireless computing device displaying a mode selection interface.

Referring to FIG. 3, in some embodiments, a mobile computing device 40 (e.g., a mobile phone, a tablet computer, a laptop computer, or other portable computing device) runs the client software application 16 to present a series of interface screens that guide a user through the steps of installing a distributed network of wireless tags in the physical premises environment 10. In general, the client software application 16 may be configured to run on any type of computer device or computing platform that includes wireless or wired communications capabilities that are compatible with the wireless tags.

On the opening screen 42, the client software application 16 presents the user with three different modes of operation, where each mode corresponds to a different respective aspect of deploying a distributed network of wireless tags: Installation, Maintenance, and Operation. In particular, the Installation mode involves installing a wireless tag at a particular location in the physical premises environment, initializing a wireless tag, verifying an installed wireless tag, and modifying an installed wireless tag. The Maintenance mode involves updating, replacing, or reinstalling wireless tags. The Operation phase involves implementing various use models.

Figure 4:
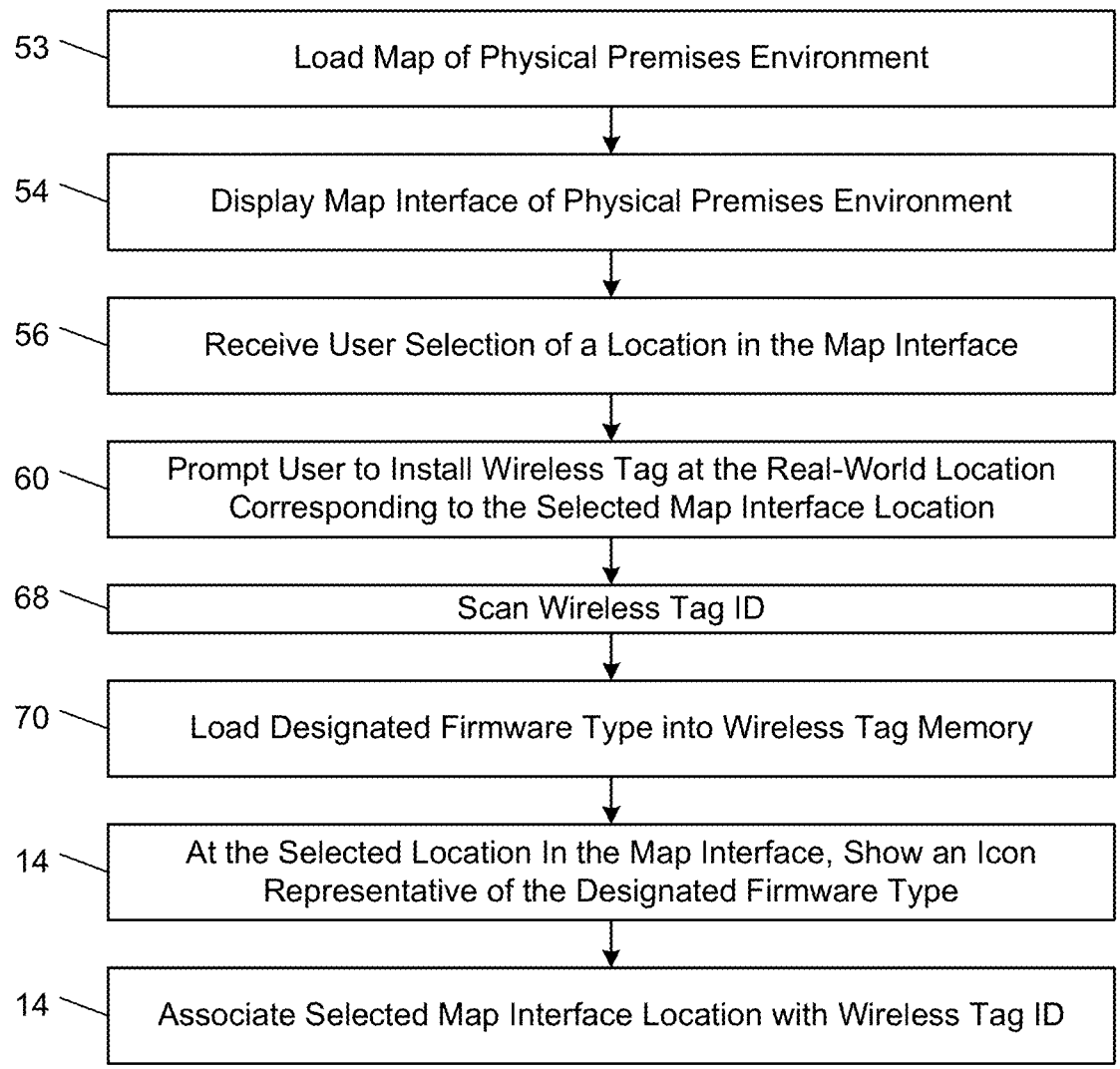
FIG. 4 is a flow diagram of a method of installing a wireless tag at a location in the physical premises environment.

FIG. 4 shows an example method of guiding a person through the steps of the wireless tag installation process. In response to user selection of the Installation mode button 44, the client software application 16 presents the user with an Installation screen 48 (see FIG. 5). The "Load Map" prompt 50 on the installation screen 48 instructs the user to load a file of a map 52 of the physical premises environment 10 (FIG. 4, block 53). The map of the physical premises environment 10 typically is in the form of a digital file and may be in any format that can be uploaded by the client software application, such as a vector file or a bitmap. In some embodiments, the locations within the physical premises environment 10 are designated by horizontal and vertical coordinates (x, y), which may or may not correspond to individual pixels. The map shows a plan view of the physical premises environment 10, including persistent features such as rooms, doors, windows, wall sockets, hallways, and transient assets such as persons, parcels, and inventory items.

In some embodiments, in addition to loading the interface map file 52, the user also may upload a list of requirements for each asset, location, infrastructure component, and person. The list of requirements may be used to at least in part automate aspects of the process of installing wireless tags in the physical premises environment.

Figure 5:
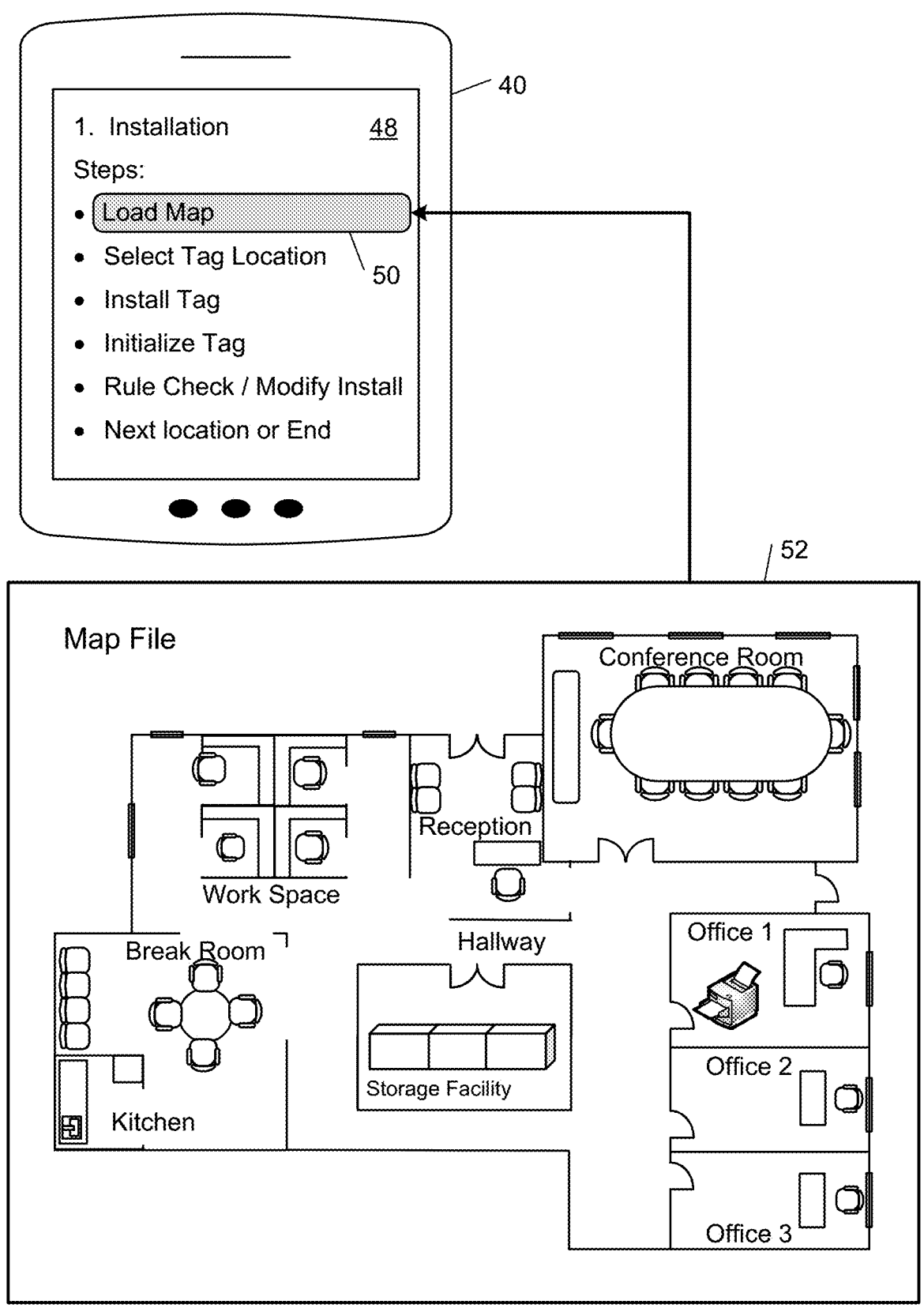
FIG. 5 is a diagrammatic view of the wireless computing device loading a map file corresponding to the physical premises environment.

FIG. 5 shows an exemplary map interface file 52 of an office space that includes a kitchen, a break room, a work space, a storage facility, hallway, a reception area, three offices, and a conference room. In general, the infrastructure features shown in the map file should accurately correlate with the corresponding infrastructure features in the physical premises environment 10 because the process of installing the wireless tags relies on the correspondences of features in the physical premises environment 10 with the features in the map view of the environment 10.

Referring back to FIG. 4, after loading the map interface file 52 into the mobile computing device 40, the client software application 16 displays a map interface of the physical premises environment 10 (FIG. 4, block 54). In the illustrated embodiment, the map interface is touch sensitive.

Figure 6A:
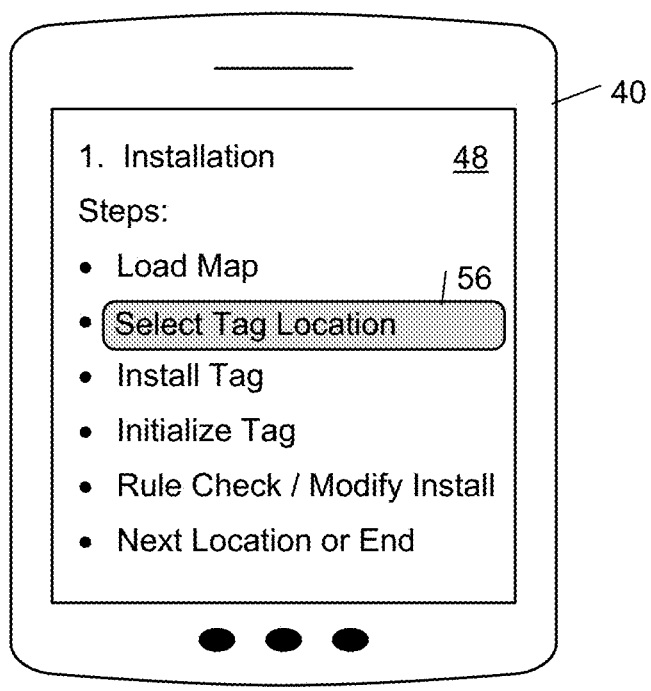
FIG. 6A is a diagrammatic view of the wireless computing device displaying a wireless tag installation interface.
Figure 6B:
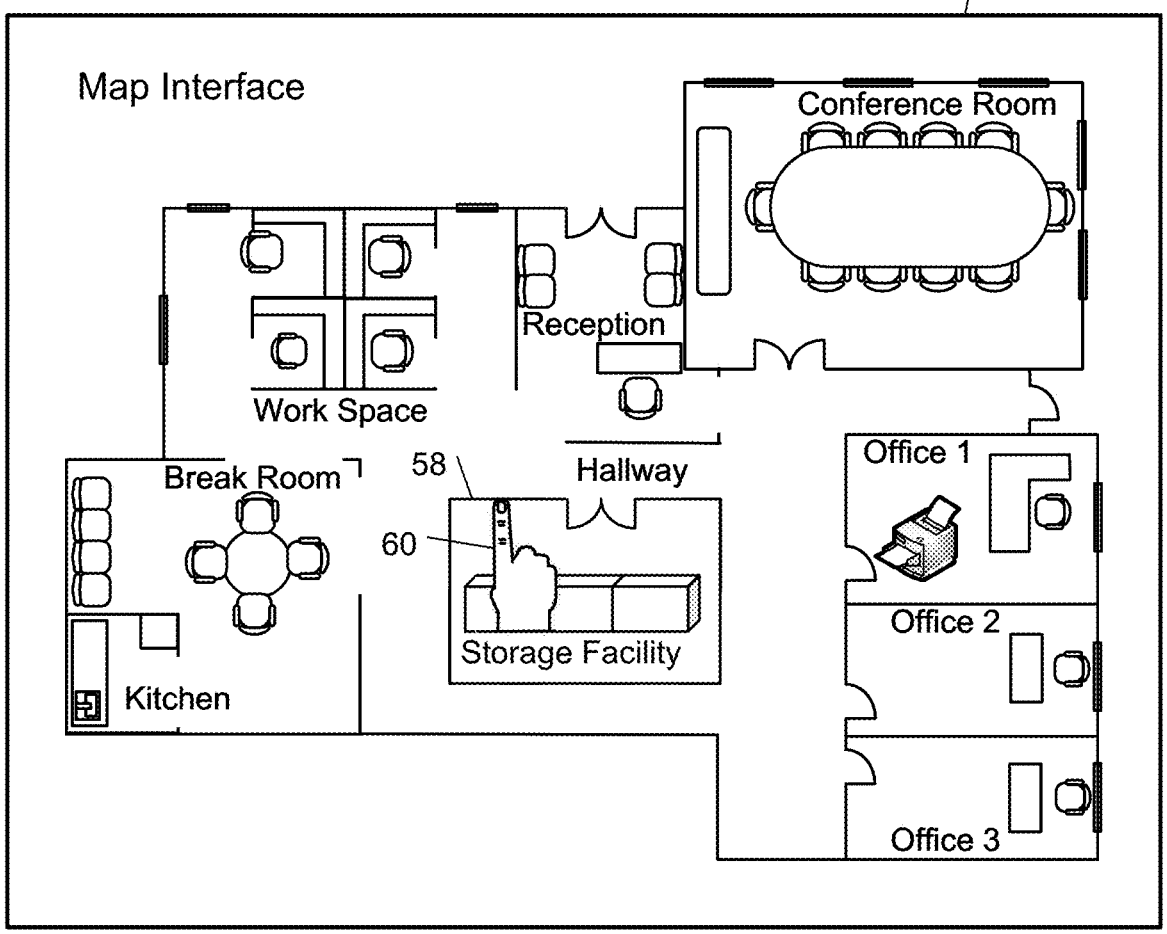
FIG. 6B is a diagrammatic view of a map interface for designating a wireless tag installation location.

Referring to FIG. 6A, the client software application 16 instructs the user to "Select Tag Location" 56 in the physical premises environment 10. As shown in FIG. 6B, the client software application receives the user's selection of a coordinate location in the map interface 52 when the user selects a location on the wall infrastructure 58 in the storage facility with a pointer 60 or the user's finger (FIG. 4, block 56).

Figure 7A:
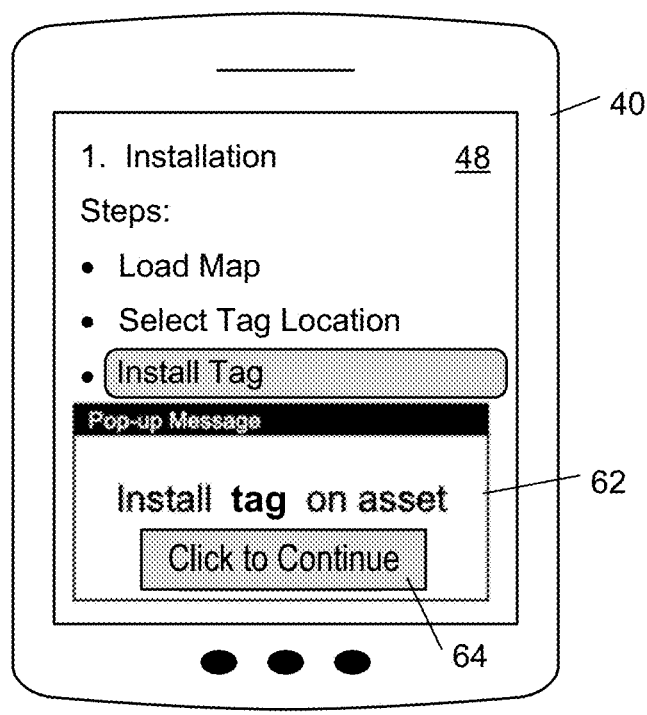
FIG. 7A is a diagrammatic view of the wireless computing device displaying a pop-up message in response to user selection of an Install Tag interface button.

Referring to FIG. 7A, in response to receipt of the selected coordinate location in the map interface 52, the client software application 16 generates a pop-up message 62 that instructs the user to install a scanner type of wireless tag at the selected location on the wall 58 infrastructure.

Figure 7B:
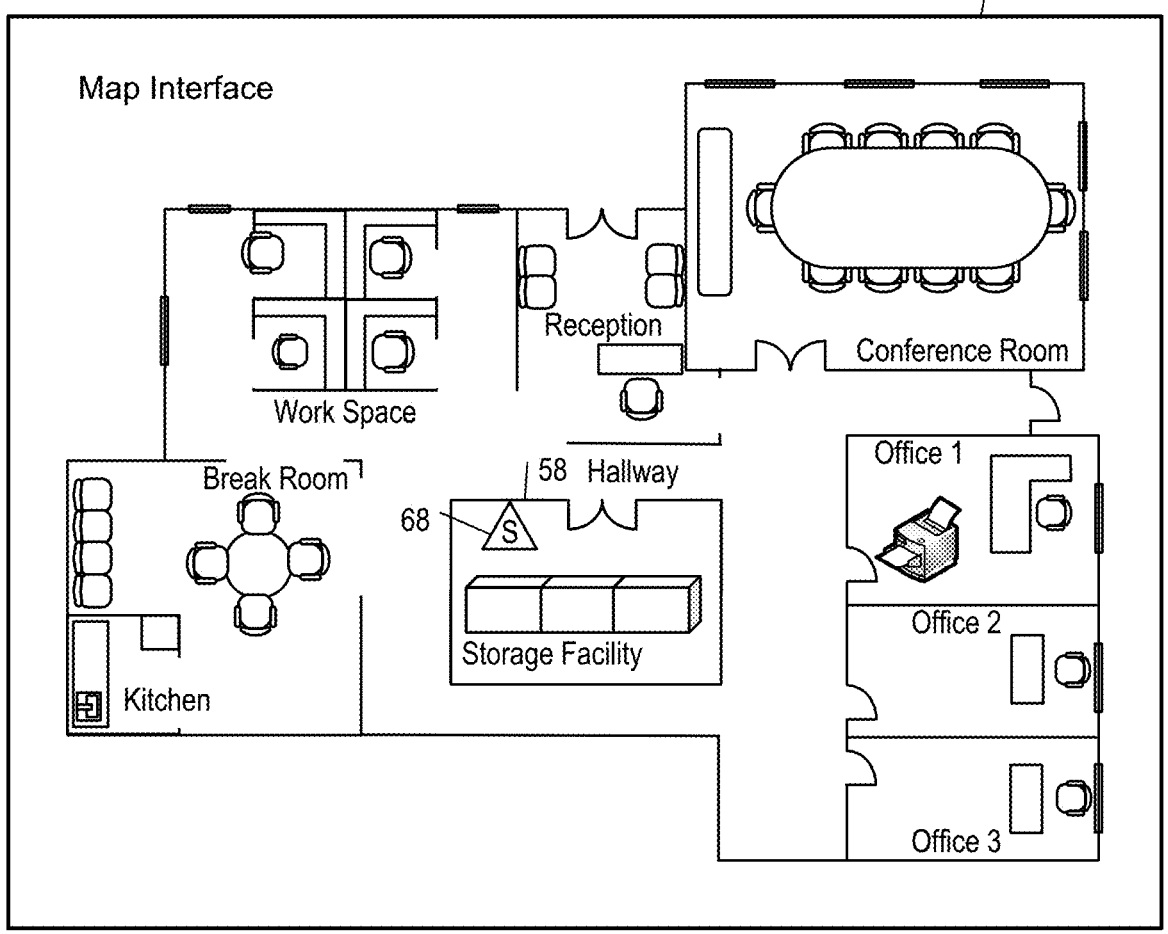
FIG. 7B is a diagrammatic view of a map interface showing the installation location of a wireless tag.

After the user has installed the scanner tag on the wall 58 infrastructure as shown in FIG. 7B, the user selects the Click to Continue button 64 in the pop-up message interface 62.

Figure 8:
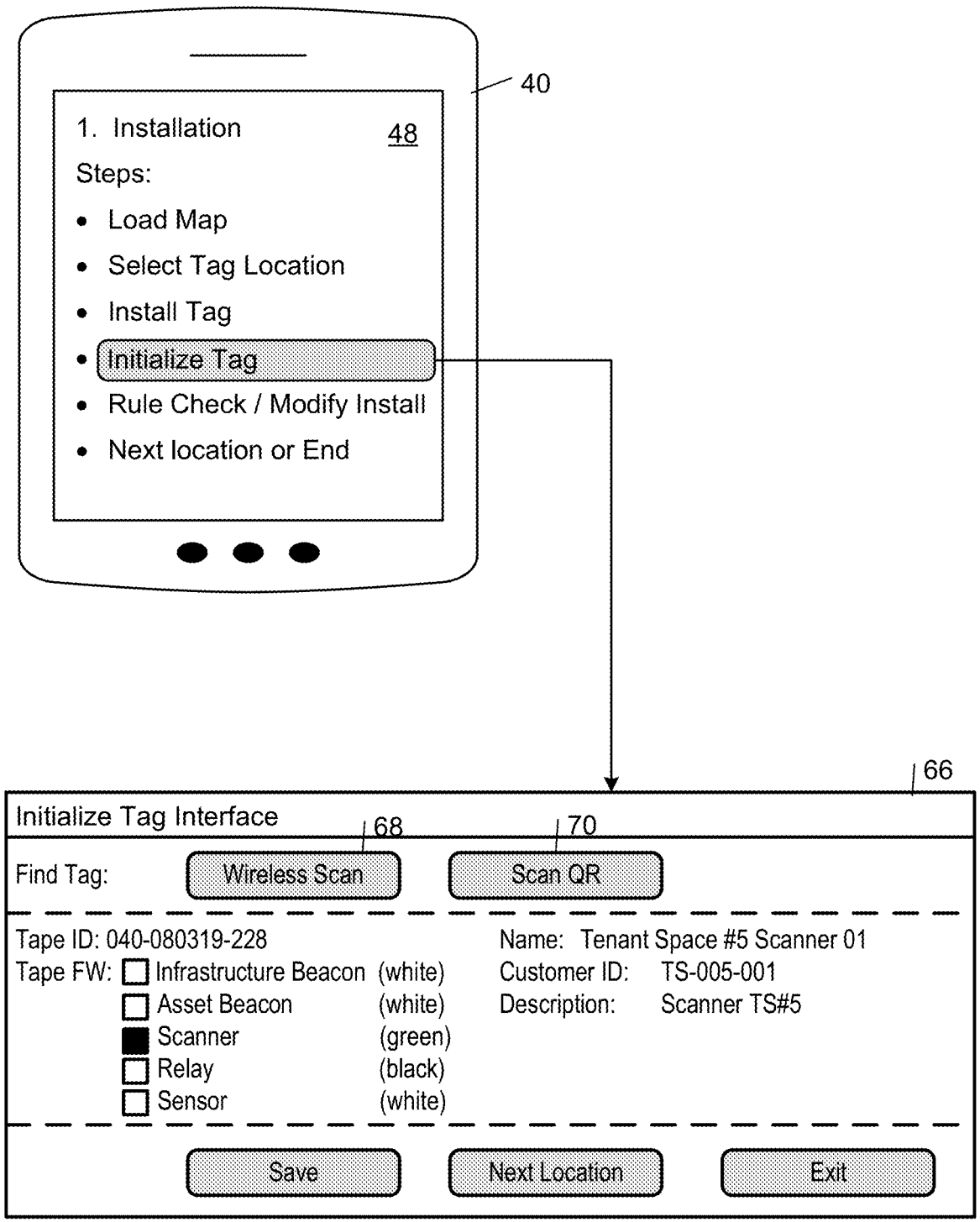
FIG. 8 is a diagrammatic view of the wireless computing device displaying an Initialize Tag button and an associated Initialize Tag Interface.

Referring to FIG. 8, the client software application 16 highlights an "Initialize Tag" instruction to prompt the user to initialize the wireless tag at the real-world location of the wireless tag corresponding to the selected location on the wall 58 in the map interface 52. The client software application 16 also displays an Initialize Tag interface 66 on the screen of the mobile device 40. In some examples, the client software application 16 is configured to display the Installation interface and the Initialize Tag interface on the mobile computing device in the same interface screen or in separate interface screens.

The Initialize Tag interface 66 includes a "Wireless Scan" button 68 for wirelessly reading a tag ID from the wireless tag and a "Scan QR" button 70 for optically reading a QR code tag ID marked on a surface of the tag. To perform a wireless scan of the tag ID, the computer software application 16 running on the mobile computing device 40 transmits one or more wireless advertising packets to the wireless tag and, in turn, receives one or more wireless packets that contain an identifier (e.g., a UUID) of the wireless tag 12. To perform an optical scan of the QR code, the computer software application running on the mobile computing device 40 includes a QR code scanning software module that extracts the identifier (e.g., a UUID) of the wireless tag from the QR code. The initialize Tag interface 66 also includes data fields for entering data relating to the wireless tag, including a Name data field, a Customer ID data field, and a Description data field.

After retrieving the ID of the wireless tag on the wall of the physical premises environment 10, the user selects the firmware type for the wireless tag. In the illustrated example, the user selects the "Scanner" firmware type, which corresponds to the second tape node type (i.e., the green or intermediate range wireless tag type). After selecting the scanner firmware type, the user selects the Save button in the Initialize Tag Interface to download the selected scanner firmware type to the wireless tag 68.

Figures 9A, 9B:
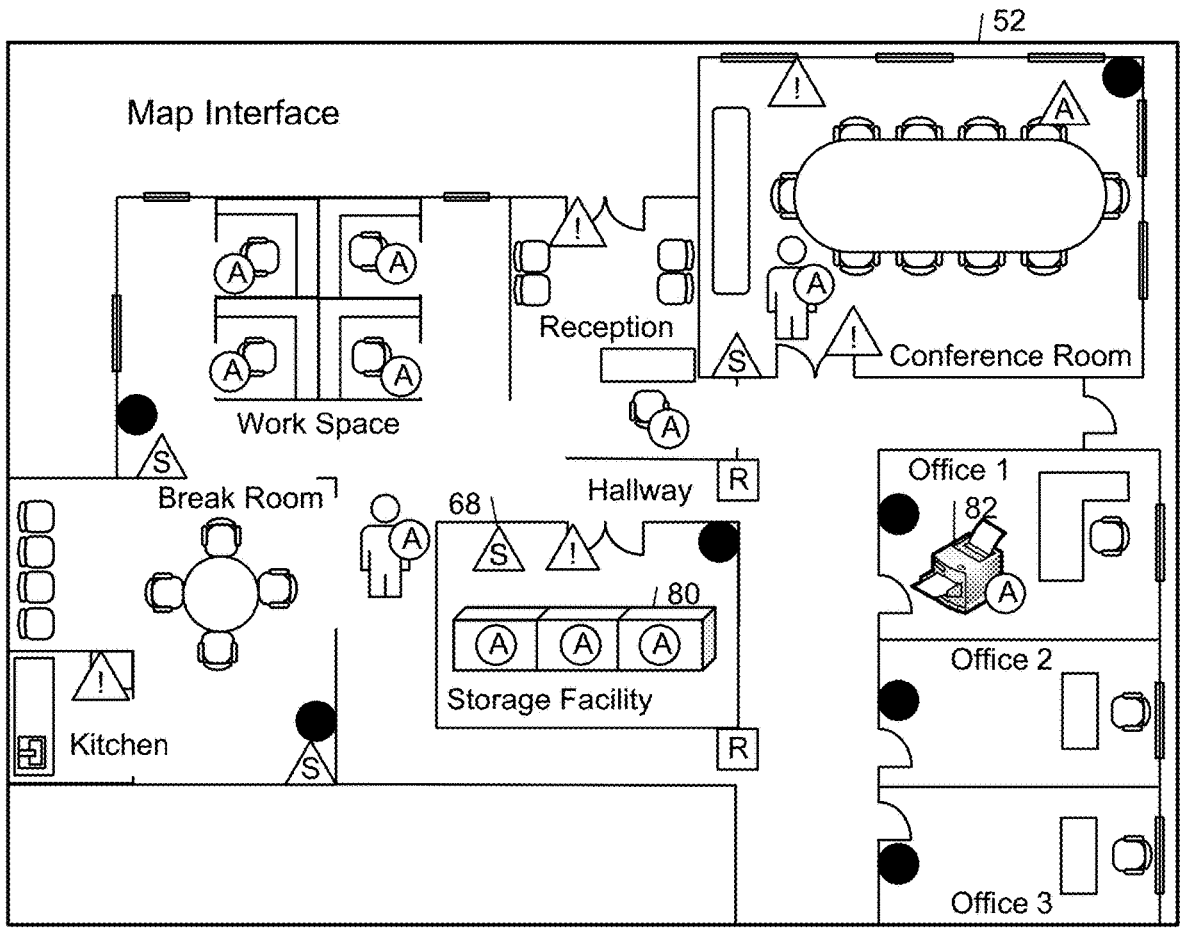
FIG. 9A is a diagrammatic view of a map view of the physical premises environment showing the installation locations of wireless tags.
FIG. 9B is diagrammatic view of a legend showing associations between different wireless tag types and their respective iconic representations.

FIG. 9A shows the map interface 52 of the physical premises environment 10 containing an example deployment of wireless tags that creates a distributed network of wireless tags. An optional legend 71 is shown in FIG. 9B to provide the correspondences between the symbols appearing in the map interface 52 and the identities of the wireless tag types. In the example deployment, infrastructure beacon tags 72 are deployed in various defined spaces (e.g., rooms) to identify the corresponding locations of the infrastructure beacons in the physical premises environment 10 (e.g., Kitchen, Work Space, Storage Facility, Conference Room, Office 1, Office 2, and Office 3). Asset beacon tags 74 are deployed on mobile assets (e.g., boxes, equipment, etc.) to identify the corresponding locations of the asset beacons in the physical premises environment 10 (e.g., a storage facility). Scanner tags 76 are deployed in locations where there are beacon tags (e.g., infrastructure beacons and asset beacons) from which to retrieve the wireless tag IDs that identify or describe the infrastructure locations (e.g., the storage facility) and the asset types in the respective infrastructure locations. Relay tags 78 are deployed to provide or bolster network coverage. The relay tags 78 relay packets transmitted by scanner tags 76. The scanner tags 76 transmit packets transmitted by asset beacons and sensor tags in the area. Sensor tags 80 are deployed to detect or measure a physical property (e.g., acceleration, temperature, humidity, etc.). The sensor tags are typically installed to provide sensing functionality for implementing a wide variety of applications and use models. For example, sensor tags may be deployed on walls, doors, windows, assets 80 (e.g., equipment 82) to measure a wide variety of physical parameters (e.g., temperature, pressure, acceleration, moisture, etc.) and detect a wide range of events (e.g., a door or window is open, an air conditioning unit is set too low, a water pipe is leaking, and a 3D printer is being moved).

Figure 10:
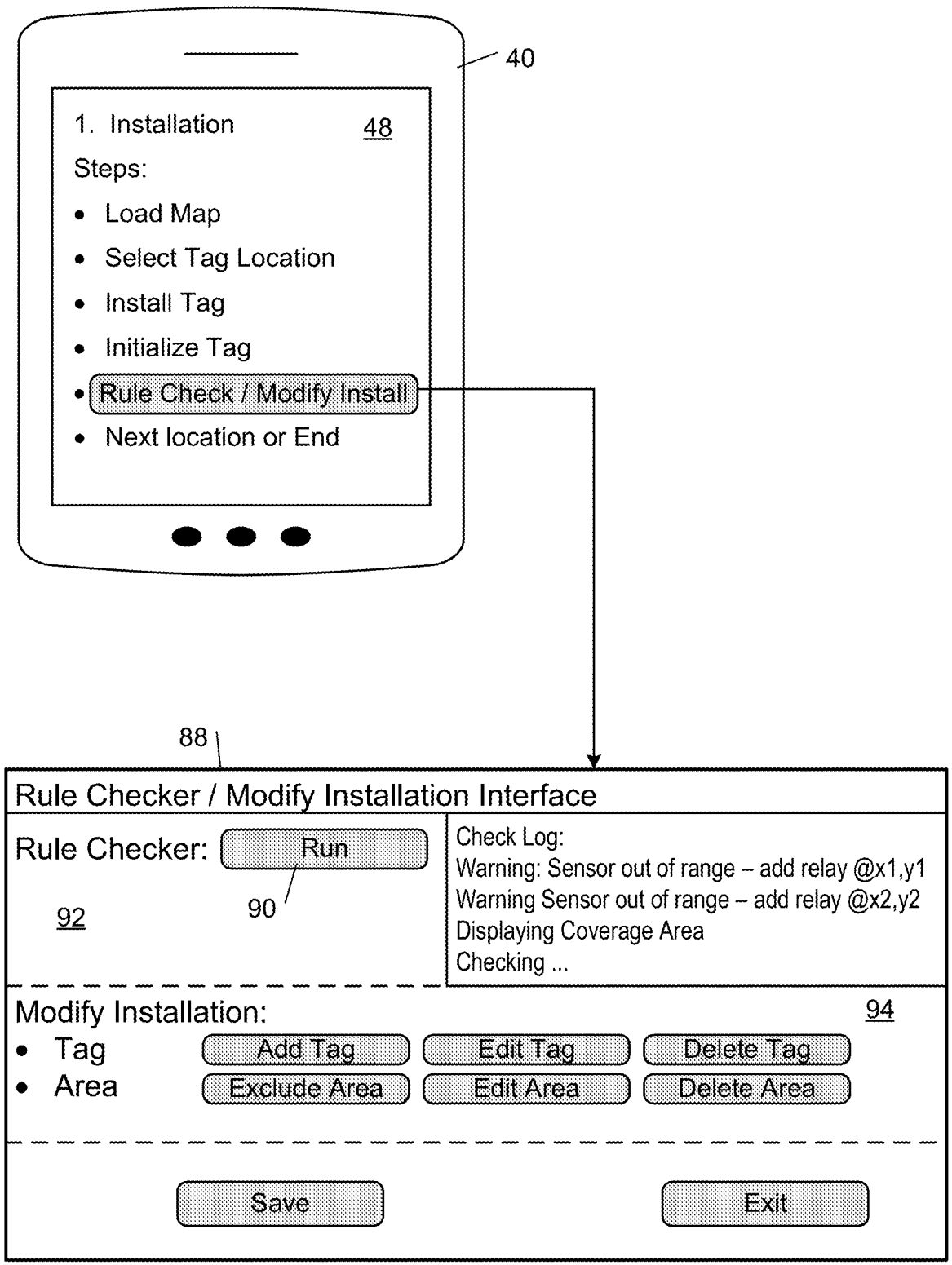
FIG. 10 is a diagrammatic view of the wireless computing device displaying a Rule Check/Modify Install button and an associated Rule Checker/Modify Installation Interface.

Design Rule Based Installation Approach:

FIG. 10 shows an automated Rule Checker/Modify Installation Interface 88 that comes up after the user exits the Initialize Tag interface 66 shown in FIG. 8.

The Rule Checker/Modify Installation interface 88 includes a Run button 90 to execute the Rule Checker component 92 of the client software application 16. In operation, the Rule Checker component of the interface 88 applies a set of predefined design rules to the current deployment of installed wireless tags. In some embodiments, the Rule Checker is associated with a set of rules specifying maximum permissible distances separating any pair of wireless tags based on the types of the wireless tags and their respective locations within the map interface 52. An example design rule specifies that no wireless tag should be out of range of all other wireless tags. Another example design rule specifies that the wireless tag deployment should provide complete coverage of relevant areas of the physical premises environment 10. In some embodiments, the Rule Checker checks for potential paths and can make recommendations for eliminating wireless coverage dead zones by proposing one or more locations to install infrastructure wireless tags (e.g., one or more relays).

In some embodiments, the areas of the Map Interface 52 without any wireless network coverage are masked (e.g., with a dark overlay) and, as coverage is added, previously masked areas will turn clear in the areas where new wireless network coverage is added. In some examples, a user can confirm that there is wireless coverage in the physical premises environment by carrying a mobile computing device 40 executing the client software application 16 through the physical premises environment and noting locations where wireless coverage is weak or non-existent.

The Modify Installation interface component 94 of the client software application 16 enables the user to modify the installation by adding, editing, or deleting wireless tags. Areas also can be added, edited, deleted. Example areas include areas demarcated by circles, rectangles, polygons, and other closed shapes. The user is able to drag and drop shapes on the map interface 52 to define the areas to exclude, edit, or delete.

Figures 11A, 11B, 11C:
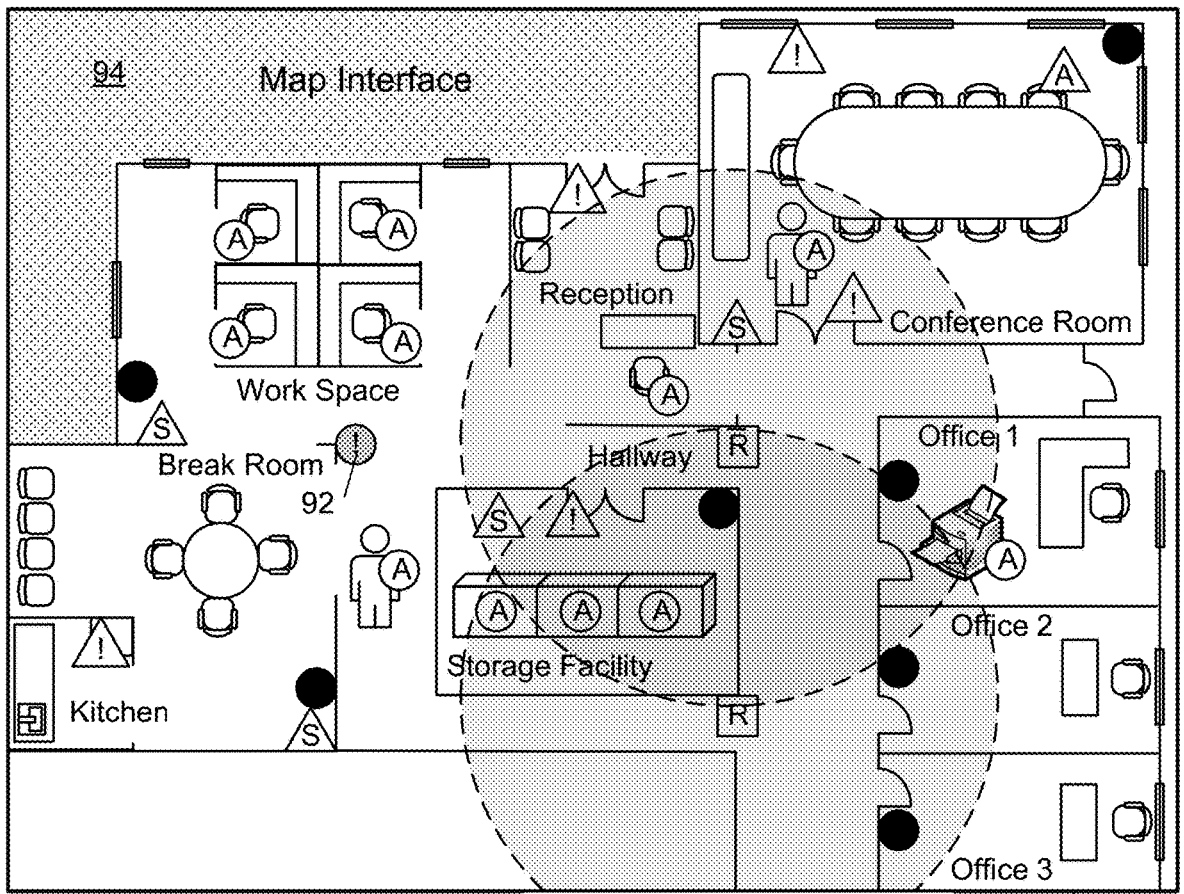
FIG. 11A is a diagrammatic view of a map view of the physical premises environment.
FIG. 11B is diagrammatic view of a legend showing associations between different wireless tag types and their respective iconic representations.
FIG. 11C is an interface window displaying parameter values characterizing a distributed wireless tag network deployed in a physical premises environment.

Referring to FIGS. 11A-11C, in an example, the Rule Checker checks design rules against a proposed wireless tag deployment, and provides the following results:

Display wireless coverage and percentage on map (e.g., 35%).

Show coverage holes (e.g., clear regions in map interface 94).

Display rule violation and suggest how adding additional wireless tags (e.g., relay) and the optimal location to install the additional wireless tags (e.g., at location 92 indicated by the proposal marker).

Display solution cost (e.g., $5,000).

Display battery life (e.g., 12 months, 3 days).

FIG. 11A shows an example in which the installation has been modified by excluding the region 94 from the installation.

Iterative Simulation—Holistic Installation Approach:

An alternative to using design rules to deploy a wireless tag network, an iterative simulation based approach may be used to install the wireless tag network. In this approach, a computer system executes a wireless tag installation simulation application program that is configured to make a wireless tag installation recommendation based on a map layout of the physical premised environment 10 (e.g., map interface 52) and a set of wireless tag requirements for each defined space in the environment 10.

Figure 12:
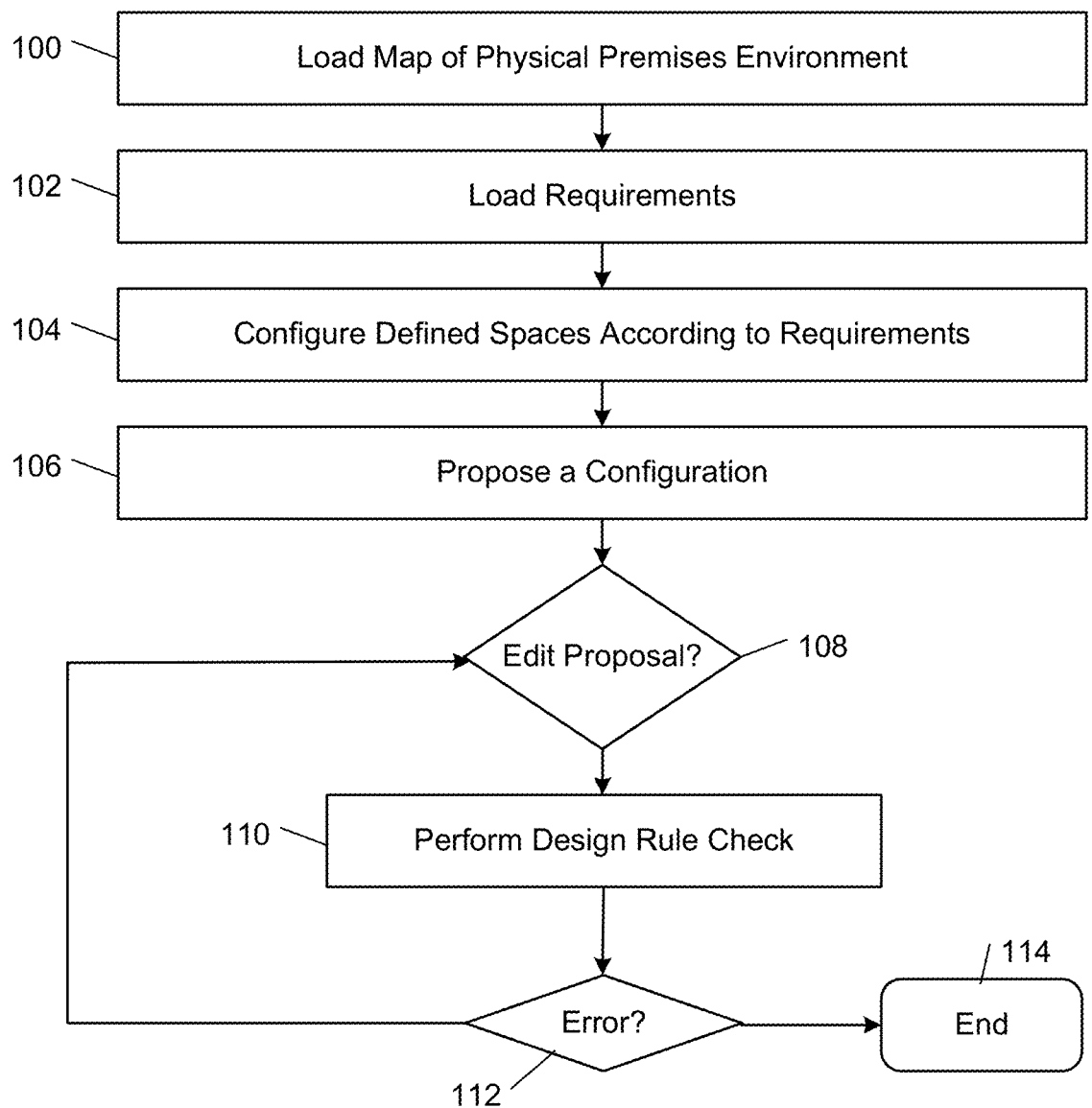
FIG. 12 is a flow diagram of an iterative simulation based process of deploying wireless tags in a physical premises environment.

Referring to FIG. 12, in operation, the wireless tag installation simulation application program loads a map file of the physical premises environment 10 (FIG. 12, block 100). The map of the physical premises environment 10 typically is in the form of a digital file and may be in any format that can be uploaded by the client software application 16, such as a vector file or a bitmap. The wireless tag installation simulation application program is configured to automatically determine the locations of the rooms and other defined spaces in the map, as well as identify the locations of doors, windows, walls, and other infrastructure of the physical premises environment 10. The requirements also may exclude rooms based on room size (e.g., too small) or room type (e.g., restrooms).

After loading the map file of the physical premises environment 10, the wireless tag installation simulation application program loads a set of requirements for the initial installation of wireless tags in the physical premises environment 10 (FIG. 12, block 102). In some examples, the requirements may be specified by the user by checking boxes in an electronic requirements form. The requirements may include, for example, installing sensor tags (e.g., motion sensing tags) on doors, windows, movable equipment, and assets, and installing scanner tags and relay tags on walls where they are needed to provide coverage.

After receiving the map file and the requirements, the wireless tag installation simulation application program configures the rooms and other defined spaces in the map of the physical premises environment 10 according to the requirements (FIG. 12, block 104).

The wireless tag installation simulation application program proposes a configuration for the physical premises environment (FIG. 12, block 106). In some examples, this process involves simulating the installation of scanner tags and relay tags in the map of the physical premises environment 10. In some embodiments, the wireless tag installation simulation application program provides a cost budget (e.g., in terms of a number of tapes needed complete the installation or in terms of a monetary cost), battery life, wireless tag network coverage, issues, alerts, warnings, and errors. In some examples, the cost is the purchase price of the wireless tags needed to implement the proposal.

The wireless tag installation simulation application program allows the user to edit the proposed configuration (FIG. 12, block 108). For example, the user can remove wireless scanner coverage for certain types of rooms (e.g., bathrooms) or can remove a wireless relay from a private area in the map of the physical premises environment 10.

After editing the initial proposal, the wireless tag installation simulation application program performs a design rules check (FIG. 12, block 110). In some embodiments, the design rules are the same as the design rules discussed above.

If there are no warnings, errors or failures in the installation (FIG. 12, block 112), the wireless tag installation simulation application program ends the process (FIG. 12, block 114); otherwise, the wireless tag installation simulation application program allows the user to edit the proposed configuration to correct the errors or failures (FIG. 12, block 108).

Figure 13A:
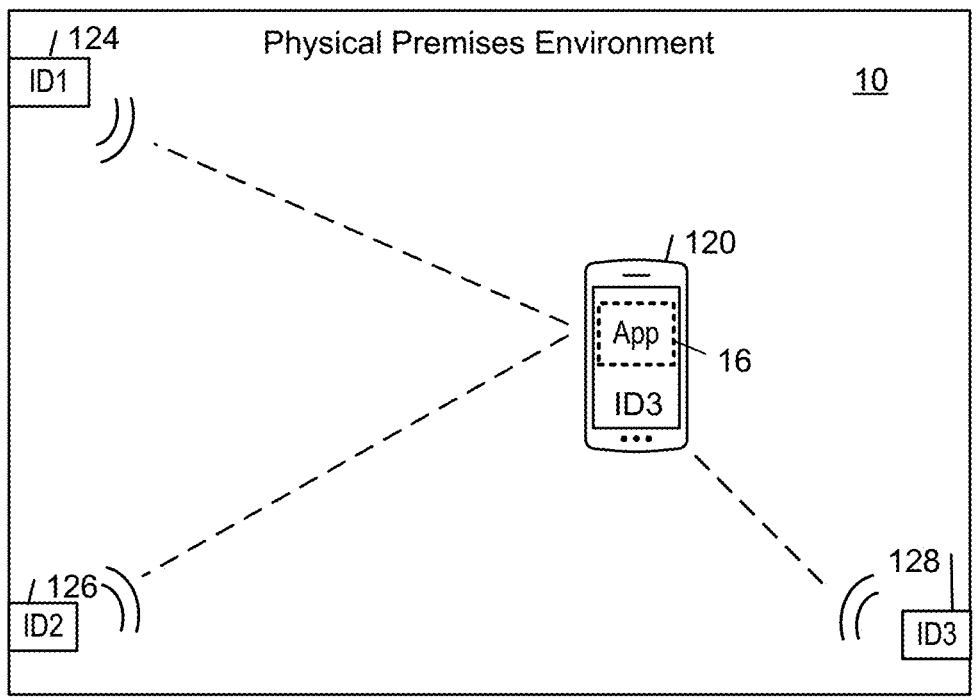
FIG. 13A is an example physical premises environment.

Test Learning Mode—Realtime Locationing:

Referring to FIG. 13A, in some embodiments, a wireless computing device 120 executes an application that includes a test-learning mode of operation in which the wireless computing device 120 transmits advertising packets into the physical premises environment 10 and receives reply signals from infrastructure wireless tags 124, 126, 128 with unique identifiers (i.e., ID1, ID2, and ID3) and respective signal strengths (e.g., RSSI). For example, in some examples, the wireless computing device 120 (e.g., a mobile phone) can transmit the advertising packets in the physical premises environment 10 and receive reply packets from wireless tags in the environment 10. The wireless computing device 120 can triangulate its location from measurements of signal strength of the beacon signals being transmitted by the wireless tags from different locations in the environment. In some embodiments, the received signal strength indicator (RSSI) is used as a measure of the power present in a received radio signal, where the received RSSI power level corresponds to respective distances between the wireless computing device 40 and the wireless tags in the physical premises environment 10. Other measures of wireless signal strength include, for example, time-of-flight and time-of-arrival measures.

Figure 13B:
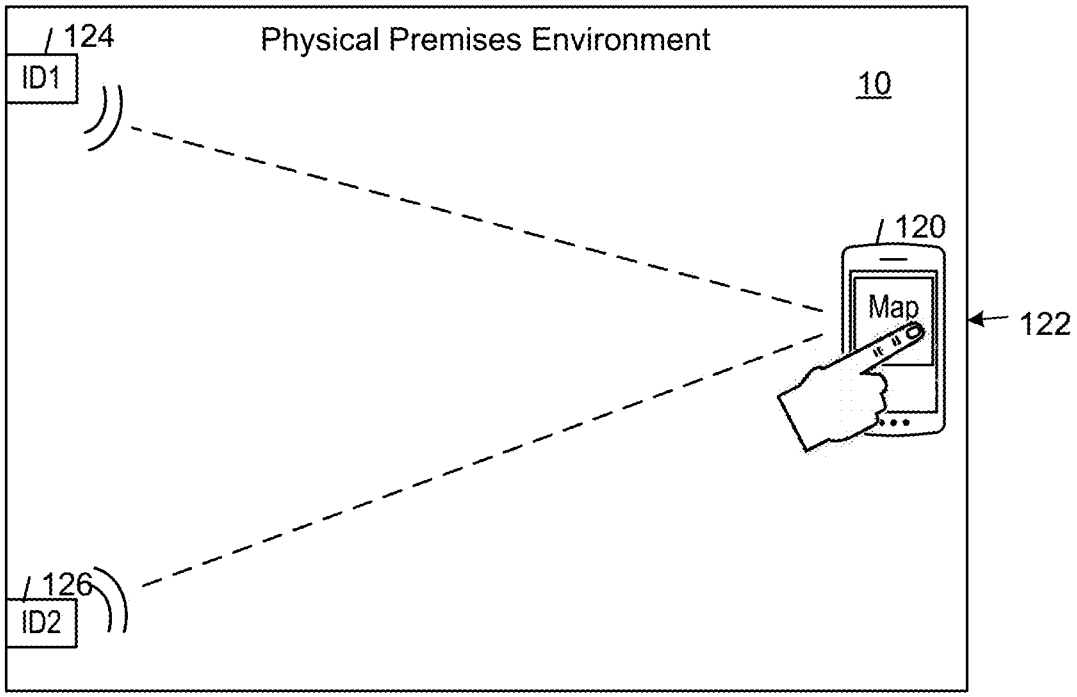
FIG. 13B is an example physical premises environment.

Referring to FIG. 13B, at some point the wireless computing device 120 may not be able to determine where it is currently located in the physical premises environment 10. For example, there may only be two or fewer infrastructure wireless tags that are within range of the wireless computing device 120. In this example, the client application 16 is configured to instruct the user to move to a particular location 122 in the physical premises environment 10, click on the particular location in the map interface to indicate the current location of the wireless computing device, and store the RSSI measurements at the particular location. The particular location may be, for example, any location that can be identified in the map interface with certainty. Examples include wall plug locations or wireless tag locations.

Figure 14A:
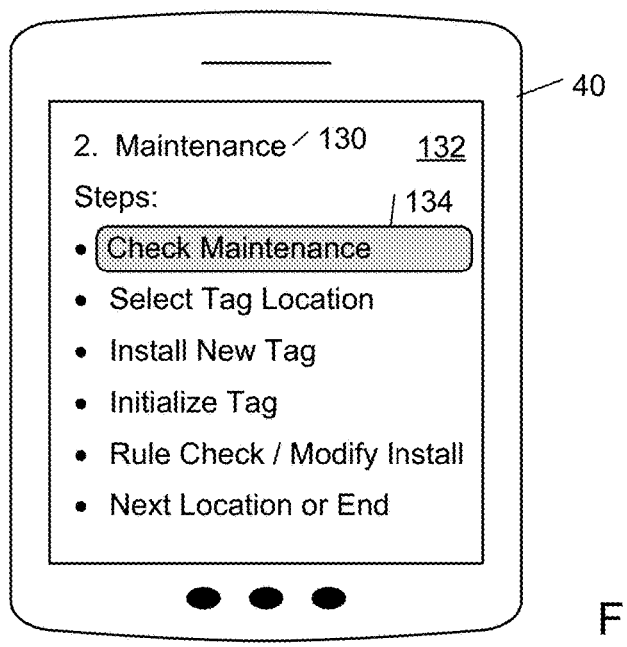
FIG. 14A is an example mobile computing device displaying a maintenance interface.

Maintenance:

FIG. 14A shows an example method of guiding a person through the steps of the wireless tag maintenance process. In response to user selection of the Maintenance mode button 130 in the mode selection screen 42 (see FIG. 3), the client software application 16 presents the user with a Maintenance interface 132 (see FIG. 5) and the map interface 52, which shows a plan view of the physical premises environment 10, including persistent features such as rooms, doors, windows, wall sockets, hallways, and transient assets such as persons, parcels, and inventory items. Depending on the size of the display screen, the Maintenance interface 132 and the map interface 52 may be displayed together in the display screen or separately.

The user may select a "Check Maintenance" button 134 in the Maintenance interface 132 to run a maintenance check on the wireless tag components in the physical premises environment 10. In some embodiments, the mobile computing device 40 transmits into the physical premises environment 10 scan request packets (e.g., BLE scan request packets) that respectively include the unique identifiers of one or more of the wireless tags that are currently deployed in the physical premises environment 10. The outgoing scan request packets may be forwarded by intermediate nodes in the wireless tag network (e.g., relay tags or scanner tags) before reaching their target destinations. In response to receipt of the scan request packets, the target nodes transmit respective scan response packets to the mobile computing device 40. In some embodiments, the scan response packets contain the unique identifiers (e.g., UUIDs) associated with the target nodes as well as maintenance information, such as battery state information (e.g., battery level, percentage, or lifetime remaining), wireless coverage, warnings, error notifications, or faults (e.g., an unresponsive wireless tag).

Figure 14B:
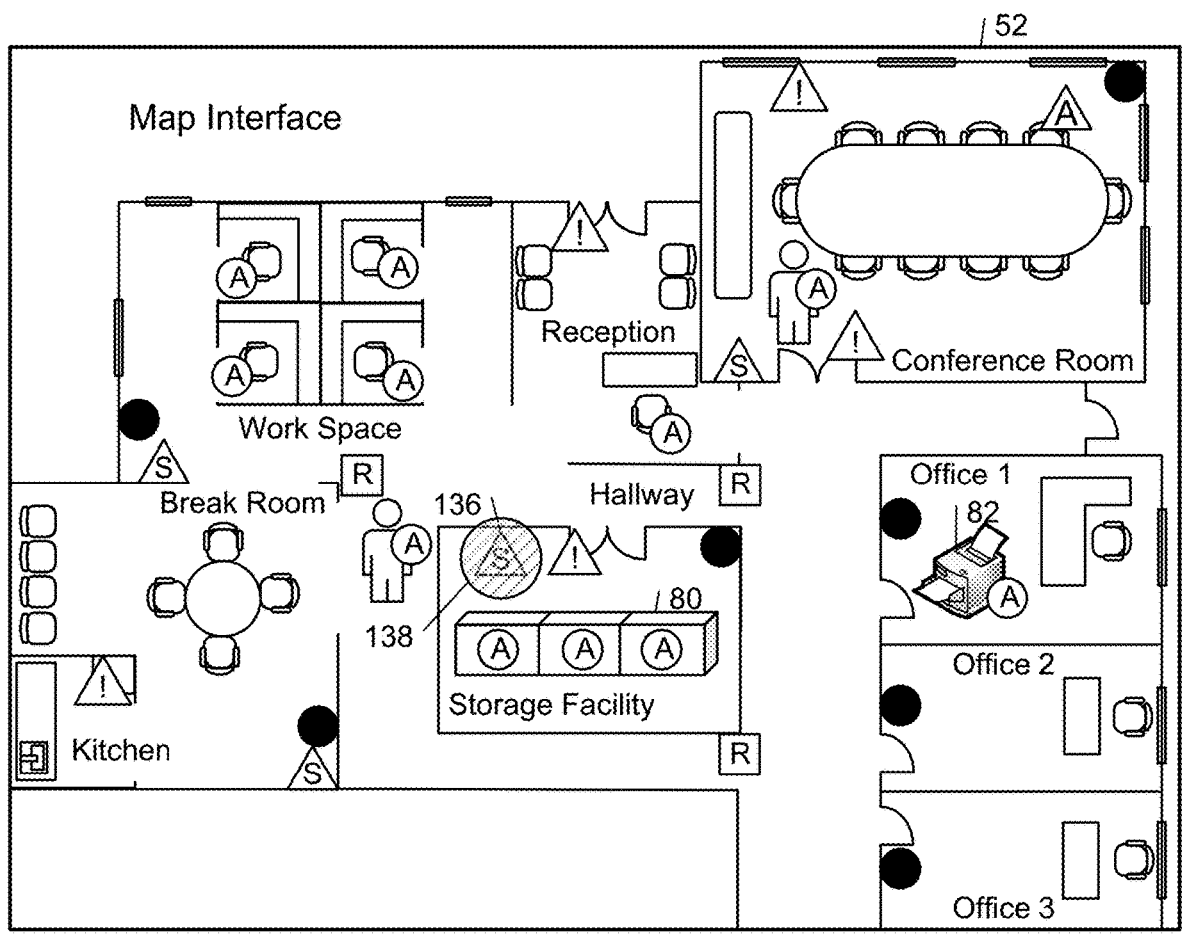
FIG. 14B is an example map interface.

Referring to FIG. 14B, in the maintenance mode of operation, the map interface 52 shows a current view of the physical premises environment 52, but displayed in an overlay mode. The map interface 52 highlights wireless tags that meet certain criteria (e.g., a battery life below a threshold percentage or below a threshold lifetime remaining, a wireless transmission range below a threshold distance, a wireless tag that reports a warning, an error, or fault). In some examples, the user can click on the graphical representation of a wireless tag to view its state information (e.g., battery life, errors, faults, and warnings). In the example shown in FIG. 14B, the map interface 52 highlights a graphical representation of a wireless scanner tag 136 that has a battery level below a target threshold level (e.g., 10%) with a shaded circular region 138. In the illustrated example, the user can select the highlighted tag 136 in the map interface 52 to pull up an interface that displays detailed state information of the tag 136.

Figure 15A:
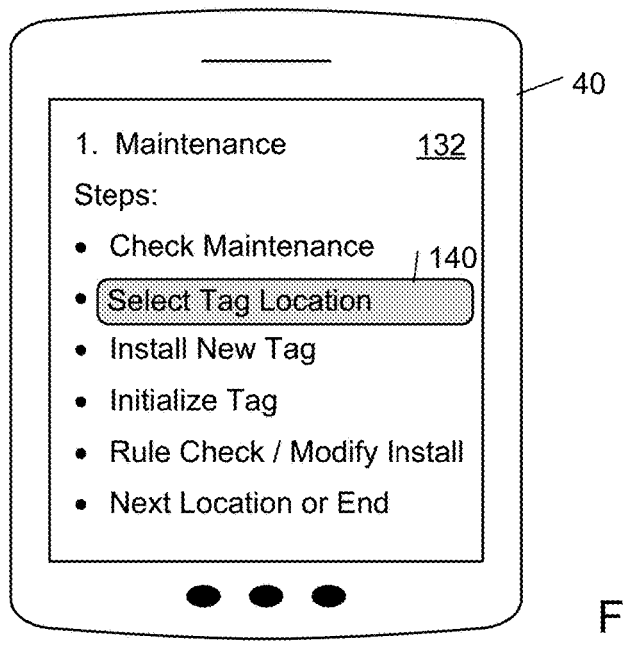
FIG. 15A is an example mobile computing device displaying a maintenance interface.
Figure 15B:
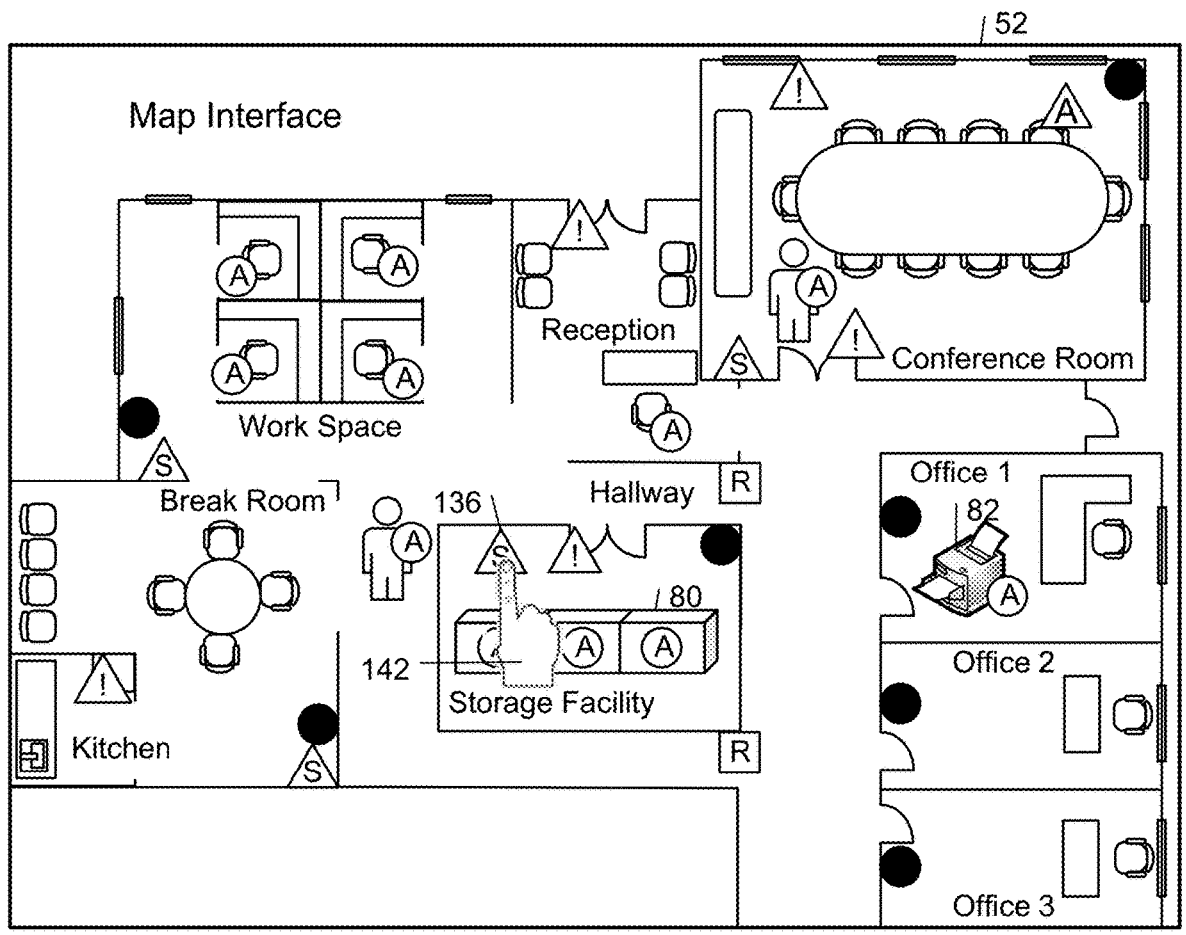
FIG. 15B is an example map interface.

Referring to FIGS. 15A and 15B, if the user determines that a wireless tag needs to be replaced, the user follows essentially the same installation steps described above in connection with FIGS. 6A-10. For example, the user can click on the Select Tag Location button 140 in the Maintenance interface 132. The user can then select the wireless tag location with the user's finger 142 or a pointer. In response to the user's selection of the wireless tag location, the dialog box 62 (see FIG. 7A) pops-up prompting the user to install a new wireless tag. The user may replace the original wireless tag 136 or apply the new wireless tag over the existing wireless tag 136. In the latter case, the name and description of the expired wireless tag 136 carries over to the replacement wireless tag, however, the new wireless tag still will need to download the appropriate firmware type, either a complete or partial version of the current firmware, and have its identifier (e.g., UUID) correlated to the wireless tag location in the map view, as explained above in connection with FIG. 8. In some examples, the appropriate firmware is downloaded from the user's mobile phone to the new wireless tag through a wireless connection (e.g., Bluetooth LE or Near Field Communication (NFC)).

In addition, the installation should be checked by the automated Rule Checker and potentially modified according to the process described in connection with FIG. 10.

Use Models:

The wireless tags can be deployed in a wide variety of different configurations to implement various use models in a variety of physical premises environments. In some examples, the deployment starts with an initial configuration, which may be specified be a server application running on a server of a network service that communicates with the client application 16 running on the user's mobile computing device 40. In an example, the client application displays an interface that allows the user to specify the type of functionality to install at designated locations or on particular object types. For example, the interface may include a series of checkboxes that allows the user to select options to, for example, monitor every door, measure temperature or pressure in every room, check the presence or status of every asset in every room, enable indoor locationing throughout the physical premises environment 10 or only in certain areas of the physical premises environment 10 at a specified level of accuracy.

Alternatively, in some examples, the interface displays a map view of the physical premises environment 10 that allows the user to designate where to install particular types of wireless tags ad hoc. For example, in some embodiments, the interface allows a user to select one of several wireless tag types presented in the interface, and to touch one or more locations in the map interface where the one or more wireless tags of the selected type should be installed.

After determining the requirements of a particular installation, the server application generates a deployment plan of wireless tags. The user can then review the deployment plan and change it, if necessary. For example, the user can add or remove wireless tags in the deployment plan.

In some embodiments, the different areas of the physical premises environment 10 are color-coded according to their function or the asset type stored therein. For example, an asset storage facility containing boxes of assets that are associated with the asset ID type of wireless tags may be highlighted green in the map interface 52. A room containing temperature-sensitive items that are associated with the temperature-measuring type of wireless tags may be highlighted blue in the map interface. A security-sensitive room with the acceleration-measuring type of wireless tags on the room doors may be highlighted red in the map interface. Hallways that are equipped with indoor locationing type of wireless tags may be highlighted yellow in the map interface. In some examples, the user is able to turn on and turn off indoor navigation in some of all of the hallways by toggling (e.g., by touching) the corresponding sections of the map interface 52 displayed in the client application 16 on the mobile computing device 40.

In some examples, the client application 16 on the user's mobile computing device 40 supports natural language voice input commands and queries. These examples typically include a speech recognizer, a command interpreter, and an optional speech synthesizer. The speech recognizer converts voice input into grammatically correct text in accordance with constraints that are imposed by a vocabulary and a language model. The speech recognizer generates recognized output (e.g., text) that represents the most likely words that were uttered in the voice input based on the vocabulary and grammar. The vocabulary specifies the set of words that can be recognized by the speech recognizer. In some examples, the speech recognizer uses a vocabulary that includes a small set of fixed commands and a set of operands that is configured based on data associated with the user (e.g., the names of persons or rooms or other infrastructure in the physical premises environment 10). The language model specifies the combinations of words that are permissible. In some examples, the language model specifies a syntax that defines the combinations of words that form grammatically correct strings (e.g., commands and their respective operands). The command interpreter uses statistical or rules-based methods to extract one or more commands and zero of more operands from the recognized output based on a set of semantic rules. Example commands are GET or FIND.

Referring back to FIG. 2, in operation, the user speaks a command into the microphone of the user's mobile computing device 40 (e.g., "Where's asset 1234?"). In response, the speech recognizer component of the mobile computing device 40 converts the spoken input into text and the command interpreter determines the intended command (e.g., "FIND") and operand (e.g., "1234"). The user's mobile computing device 40 executes the command on the operand by transmitting one or more advertising packets that include the FIND command and the UUID 1234 to one or more wireless tags or a person wearing a wireless ID tag in the physical premises environment 10 until it receives a reply packet from the wireless asset tag 1234 or other wireless tag (e.g., a scanner tag) that includes a description of the location of the asset with the UUID 1234 (e.g., "storage facility").

Business Processes: Triggers, Conditions, and Events:

Wireless tags can be programmed with software or firmware instructions that enable the tags to respond to triggers, conditions, and events and thereby implement a wide variety of business processes and other use models.

For example, a wireless node in the storage facility is programmed with instructions to measure the temperature in the storage facility, and if the measured temperature is below 30° Celsius transmit an alert or warning message (e.g., a short message service or SMS, an email, or a cellular phone call) to one or more designated endpoints.

Multiple triggers and conditions can be combined using Boolean equations to combine triggers for complex events. For example:

A wireless tag associated with a person raises an alert of the person is in a certain room at a certain time but leaves too early.

A wireless tag transmits an alert message if it measures the temperature of in a room below a threshold temperature level.

If certain package of drugs is in a warehouse and if the temperature measured by a wireless tag in the warehouse is below a threshold temperature level, then send a SMS message to employee Ajay if he's in the warehouse, otherwise send the SMS message to employee Erik.

If a certain package of drugs is in a building and two packages that are supposed to be closely associated with the certain package, raise an alert.

If a certain package of drugs is leaving the building at 11 pm, raise an alert.

If the oscilloscope is leaving the building, raise an alert.

If Scott is operating the 3D printer and Ajay is not nearby, raise an alert.

If people start manufacturing items in a warehouse and an inventory item #6 does not exist, raise an alert.

Workflow Visibility:

A workflow specifies an order in which tasks are performed and the conditions for initiating tasks. A task can be performed by one or more computing systems, by one or more persons, or both. As mentioned above, individuals can be associated with respective wireless tags (e.g., by carrying a wireless ID tag) and therefore their locations can be determined and tracked in the physical premises environment 10. The activities of the individuals in the physical premises environment can be determined directly or inferred by their respective locations, the equipment they are using, their roles, and their collaborations with one another. The activities then can be organized into groups by type.

The wireless tag network deployed in the physical premises environment 10 can then store data regarding the activities performed by the individuals. Examples of the types of data that might be collected include: when an individual arrives at work; when an individual starts using equipment; who is using the equipment; and is the equipment always being used by the same individual or individuals. After a sufficient amount of data has been collected, statistics for some or all of the activities can be determined. Statistical analyses of distributions (e.g., Gaussian distributions) of various activities can be performed on the collected data to ascertain outliers. For example, for a given airline company, for each airport location, what are the arrival and completion times of airplane cabin cleaning personnel, the baggage loading and un-loading crew, and the food service team after an airplane lands. What is the impact on costs? In some examples, statistical outliers reveal opportunities to recommend changes.

In some examples, the collected data is grouped by category and mapped to respective views of warnings, alerts, and actions as a function of time, and a view of recommendations. These views can be generated from, for example, the arrival and completion times of airplane cabin cleaning personnel at each airport location by generating relevant statistics and identifying outliers for further investigation and recommendations.

Figure 16:
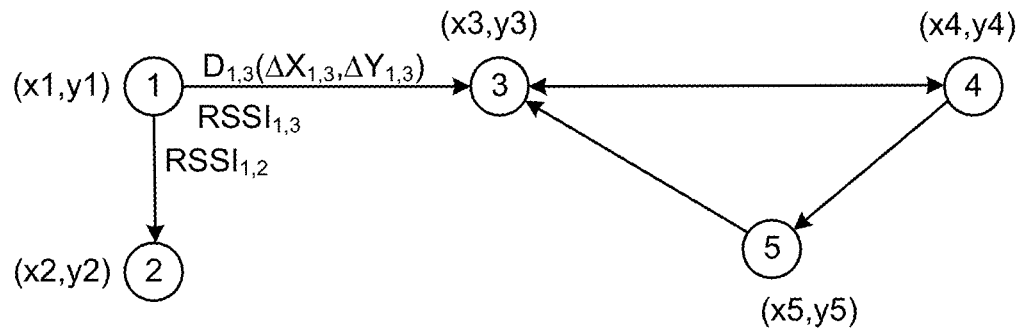
FIG. 16 is an example deployment graph model

Operating System:

FIG. 16 is a deployment graph model that shows interconnections between a set of wireless tags (also referred to herein as "nodes"). Each node has a unique ID (e.g., 1, 2, 3, 4, and 5) and is configured as a particular node type (e.g., asset node, infrastructure node, scanner node, relay node, or sensor node). The nodes that are connected by edges can communicate with one another, either uni-directionally or bidirectionally. The nodes are separated by geometric distances. For example, the distance between nodes 1 and 3 is given by $D_{1,3}=((\Delta X_{1,3})^2+(\Delta Y_{1,3})^2)^{1/2}$ for a two-dimensional layout of nodes. Each node also receives signals from zero or more of the other nodes in the set that are characterized by respective Received Signal Strength Indicator (RSSI) values. For example, the RSSI value $RSSI_{1,3}$ corresponds to the strength of the signal transmitted from node 1 to node 3, and the RSSI value $RSSI_{1,2}$ corresponds to the strength of the signal transmitted from node 1 to node 2. In addition to geometric distance and RSSI parameters, the graph notation illustrated in FIG. 16 can be used to model other parameters that characterize the operation of wireless tag network.

Figure 17:
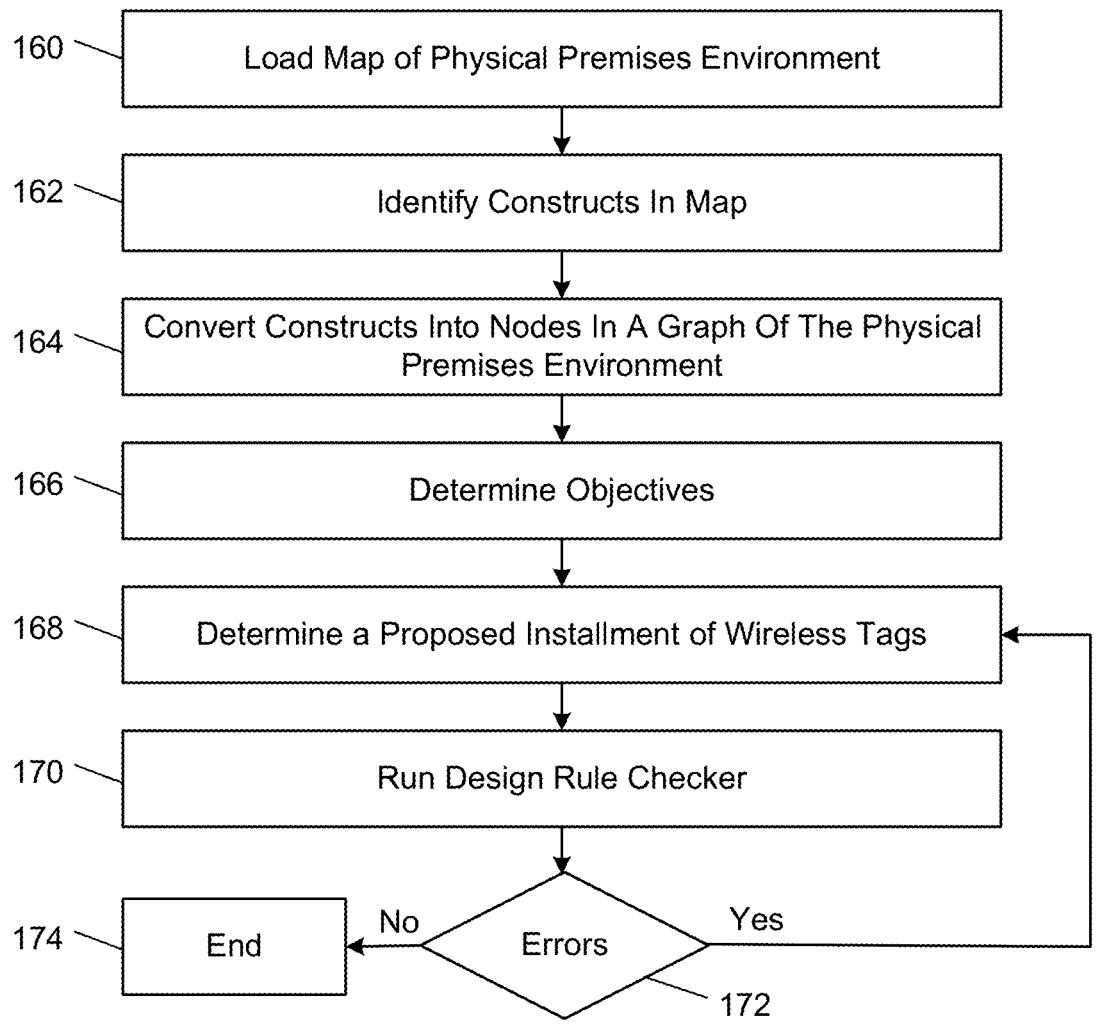
FIG. 17 is an example flow diagram of a method of translating a deployment graph model to a physical world model.

Referring to FIG. 17, the deployment graph model can be translated to a physical world model that includes constructs, such as a room, a door, a hallway, an asset, or a person. In some embodiments, the server application starts with a digital map of the physical premises environment 10 (FIG. 17, block 160). The map file may be a vector file or a bitmap. The server application identifies constructs in the map, such as rooms, doors, wall sockets, windows, and hallways, (FIG. 17, block 162). The server application then converts the map into a graph of the physical premises environment 10 (FIG. 17, block 164). The constructs are separated from one another by respective geometric distances (e.g., $D_{1,3}=((\Delta X^{1,3})^2+(\Delta Y_{1,3})^2)^{1/2}$). Each construct has a name, a description, one or more services it can offer, and one or more capabilities. In response to user input, the client application 16 requests a proposed configuration for the physical premises environment 10 (see, e.g., FIG. 12, block 106). The server application executing on the server network node of the network service determines a proposed configuration that meets the set of objectives for the deployment of the various constructs (FIG. 17, blocks 166, 168). An example set of objectives includes: sense temperature in every room; provide indoor locationing in the main hallway; and determine when a door or window of a room is open. The configuration is stored in memory as a graph of objectives and respective constraints. In one example, the graph of objectives and constraints includes: install a scanner in every room larger than 100 square meters in area; install an accelerometer on every door and window of every room larger than 100 square meters in area; and install an infrastructure locationing beacon in the main hallway.

After the initial set of wireless tags is proposed, the design rule checker is executed to determine if any design rules are violated (e.g., the distance separating two wireless nodes is greater than the range of the wireless nodes) (FIG. 17, block 170). If the design rule checker application reports an error or other violation (FIG. 17, block 172), the server application determines another optional installment of wireless tags (FIG. 17, block 168); otherwise, the process ends (FIG. 17, block 174).

In some embodiments, the design rule checker automatically proposes one or more locations where one or more wireless tags (e.g., relays) should be installed to comply with the rules. For example, the design rule checker generates a proposal for installing a relay in a wall socket in the main hallway. In another example, the design rule checker recommends installing three infrastructure locationing beacons at three different spaced-apart locations on at least two walls of a hallway or three infrastructure locationing beacons as far apart from one another on different walls of a room while still remaining within communication range of each other.

The wireless tag deployment process described above in connection with FIG. 17 implements a greedy algorithm to determine the configuration of wireless tags in the physical world model.

Figure 18:
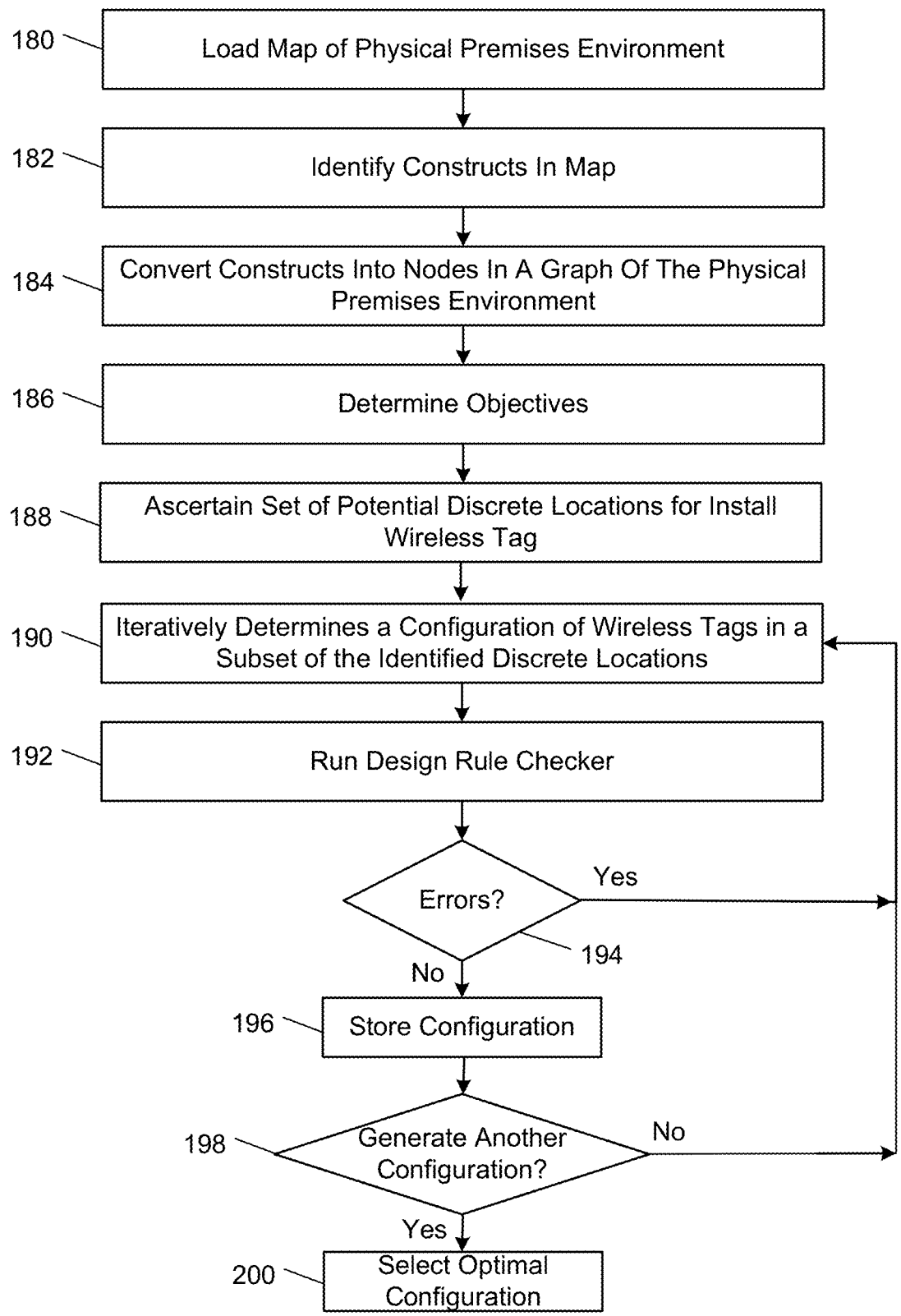
FIG. 18 is an example flow diagram of a method of iteratively determining configurations of wireless tags.

In another approach, an exhaustive search is used to determine an optimal, lowest cost configuration of wireless tags in the physical premises environment 10 that satisfies the objectives subject to the applicable constraints. In some embodiments, the server application starts with a digital map of the physical premises environment 10 (FIG. 18, block 180). The map file may be a vector file or a bitmap. The server application identifies constructs in the map, such as rooms, walls, doors, wall sockets, windows, and hallways, (FIG. 18, block 182). The server application then converts the map into a graph of nodes representing the relationships between the constructs in the physical premises environment 10 (FIG. 18, block 184). The constructs are separated from one another by respective geometric distances (e.g., $D_{1,3}=((\Delta X_{1,3})^2+(\Delta Y_{1,3})^2)^{1/2}$). In some examples, each construct has one or more of a name, a description, one or more services it can offer, and one or more capabilities.

In response to a request from the client application 16 running on the mobile computing device 40, the server application executing on the server network node of the network service determines a set of objectives to be implemented by the wireless tags in relation to the various constructs (FIG. 18, blocks 186). An example set of objectives includes: sense temperature in every room; provide indoor locationing in the main hallway; and determine when a door or window of a room is open or closed.

The server application identifies a set of potential discrete installation locations for the wireless tags in relation to the constructs identified in block 182 (FIG. 18, block 188). Examples of potential discrete installation locations include constructs within rooms, hallways, and stairwells, such as walls of rooms, hallways, and stairwells, doors, windows, and other infrastructure. The server application iteratively determines a respective configuration of wireless tags in a subset of the identified discrete locations (FIG. 18, block 190).

For each configuration, the server application runs the design rule checker (FIG. 18, block 192) to determine if there are any errors in the configuration (FIG. 18, block 194). If there are any errors in the proposed configuration (e.g., an infrastructure node is outside the wireless communications range of all other wireless tags) (FIG. 18, block 194), the server application iteratively determines another configuration of wireless tags in a subset of the identified discrete locations (FIG. 18, block 190). If there are no errors in the proposed configuration (FIG. 18, block 194), the server application stores the proposed configuration in a memory storage device (FIG. 18, block 196). In some examples, the configuration is stored in memory as a graph of objectives and respective constraints.

After all the configurations have been determined (FIG. 18, block 198), the server application selects an optimal configuration (FIG. 18, block 200). Determining an optimal configuration involves solving an NP (nondeterministic polynomial time) complete problem to determine a configuration that satisfies all objectives and constraints. In an example, the optimal configuration is a configuration that achieves the lowest cost deployment of wireless tags in the physical premises environment 10.

After the optimal configuration of wireless tags has been determined for a given physical premises environment, the wireless tags are deployed in the physical premises environment as explained above.

Runtime:

After the wireless tags are deployed in the physical premises environment, the wireless tag network is operational. In this regard, each wireless tag is programmed with respective firmware that defines its mission, its low-battery mission, one or more customer services that it provides, and one or more system services that it provides.

The missions and services provided by a wireless tag are determined by its tag type (e.g., relay tag, scanner tag, infrastructure tag, asset tag, and sensor tag).

Relay tags are configured to scan for advertising packets from wireless tags that are within range, receive wireless packets from other wireless tags, and relay those packets into the physical premises environment 10. In some examples, relay tags are configured to scan for advertising packets, receive data packets, and relay data packets more frequently than when it is in its low-battery mission state. The scanner tags are configured to listen for beacon packets from asset tags, infrastructure tags, and sensor tags, and to transmit data packets to the relay tags. Asset tags, infrastructure tags, and sensor tags are configured to transmit identifying information to other wireless tags (e.g., scanner tags or relay tags).

The customer services provided by the wireless tags include responding to requests from the client application 16 running on the mobile computing device 40. For example, in response to a request from the mobile computing device 40, a motion sensing wireless tag on a door of a room is configured to wirelessly communicate to the mobile computing device 40 when the door was last opened. In another example, in response to requests from the mobile computing device 40, a set of infrastructure wireless tags at different wall locations in a hallway are configured to wirelessly transmit beacon packets to provide indoor locationing to the user.

The system services provided by the wireless tags include listening for advertising packets, generating data packets, receiving data packet, and transmitting generated and received data packets into the physical premises environment 10. In particular, as prescribed by the system services firmware component, every wireless tag sends the data generated or received according to its primary or low battery mission into the physical premises environment 10. The generated or received data is stored on one or more nodes and propagated to all of the wireless tags throughout the environment 10 either ad hoc or at scheduled times so that every wireless tag capable of receiving data shares essentially the same data.

Figure 19:
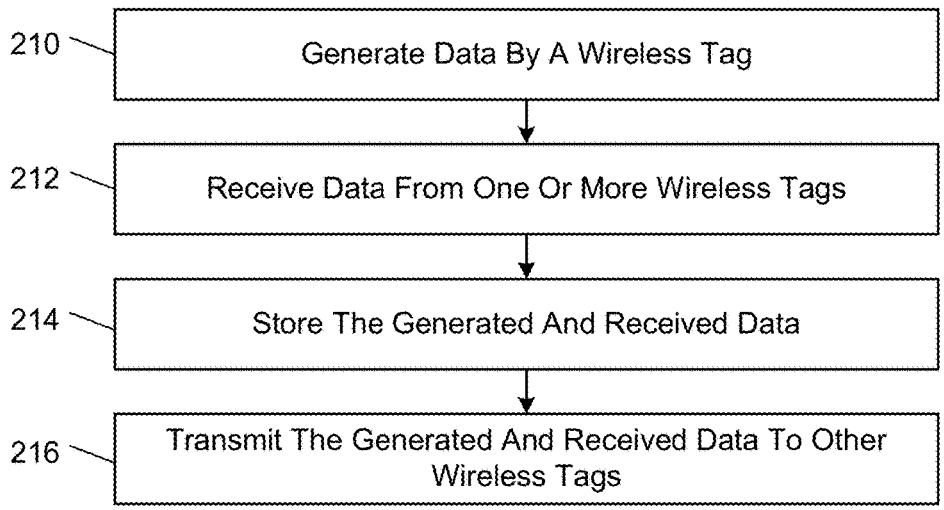
FIG. 19 is an example flow diagram of a method of propagating data between wireless tags.

FIG. 19 shows an example process of propagating data from one wireless tag to another. A wireless tag generates data (FIG. 19, block 210). The data may be any type of data that can be generated by the wireless tag, including sensor data, communications data, configuration data, and advisory data (e.g., errors or alerts). The wireless tag receives data from one or more wireless tags in the physical premises environment 10 (FIG. 19, block 212). The received data may be any type of data that can be received by the wireless tags, including sensor data, communications data, configuration data, and advisory data (e.g., errors or alerts). The generated and stored data is stored in the memory of the wireless tag (FIG. 19, block 214). The wireless tag transmits the generated and received data to other wireless tags in the environment (FIG. 19, block 216).

In this way, a user of the client application 16 running on the mobile computing device can have visibility throughout the physical premises environment 10. For example, the user can determine the location of her mug by using the search interface of the client application 16 on the mobile computing device 40 to find the wireless tag associated with the mug in the physical premises environment 10. In response, the mobile computing device transmits the request to the nearest receptive wireless tag, which checks its memory for an entry that includes the identity of the user's mug and its associated location. If the entry exists, the user has located her mug. If the entry does not exist in the memory of nearest receptive tag, the nearest receptive tag forwards the request to other wireless tags in the environment 10 until the mug's location is reported by one or more of the other wireless tags.

Exemplary Computer Apparatus

Figure 20:
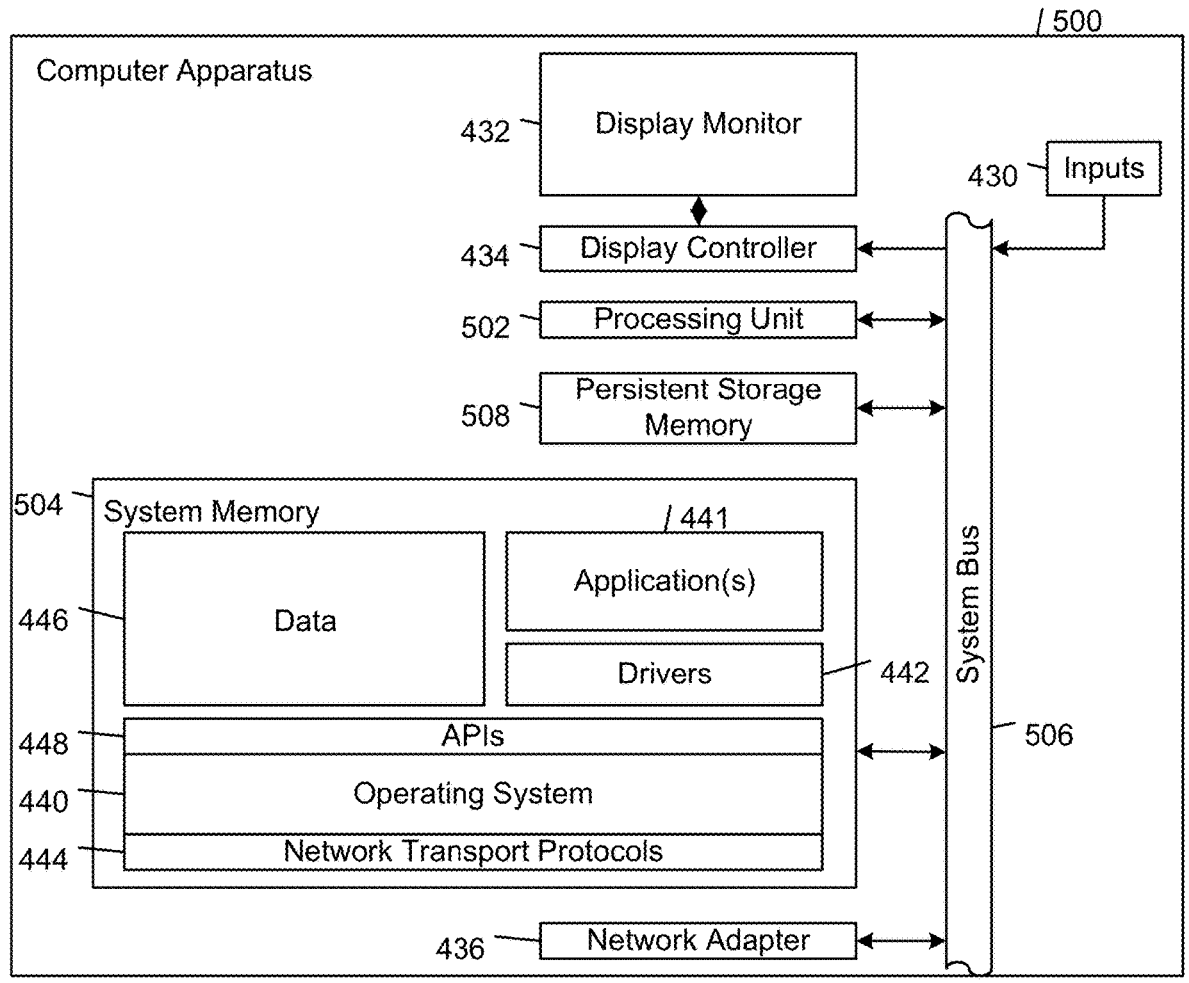
FIG. 20 is an example block diagram of an example computer apparatus.

FIG. 20 shows an example embodiment of computer apparatus that is configured to implement one or more of the systems described in this specification. The computer apparatus 500 includes a processing unit 502, a system memory 504, and a system bus 506 that couples the processing unit 502 to the various components of the computer apparatus 500. The processing unit 502 may include one or more data processors, each of which may be in the form of any one of various commercially available computer processors. The system memory 504 includes one or more computer-readable media that typically are associated with a software application addressing space that defines the addresses that are available to software applications. The system memory 504 may include a read only memory (ROM) that stores a basic input/output system (BIOS) that contains start-up routines for the computer apparatus 500, and a random access memory (RAM). The system bus 506 may be a memory bus, a peripheral bus or a local bus, and may be compatible with any of a variety of bus protocols, including PCI, VESA, Microchannel, ISA, and EISA. The computer apparatus 500 also includes a persistent storage memory 508 (e.g., a hard drive, a floppy drive, a CD ROM drive, magnetic tape drives, flash memory devices, and digital video disks) that is connected to the system bus 506 and contains one or more computer-readable media disks that provide non-volatile or persistent storage for data, data structures and computer-executable instructions.

A user may interact (e.g., input commands or data) with the computer apparatus 500 using one or more input devices 430 (e.g. one or more keyboards, computer mice, microphones, cameras, joysticks, physical motion sensors, and touch pads). Information may be presented through a graphical user interface (GUI) that is presented to the user on a display monitor 432, which is controlled by a display controller 434. The computer apparatus 500 also may include other input/output hardware (e.g., peripheral output devices, such as speakers and a printer). The computer apparatus 500 connects to other network nodes through a network adapter 336 (also referred to as a "network interface card" or NIC).

A number of program modules may be stored in the system memory 504, including application programming interfaces 438 (APIs), an operating system (OS) 440 (e.g., the Windows® operating system available from Microsoft Corporation of Redmond, Wash. U.S.A.), software applications 441 including one or more software applications programming the computer apparatus 500 to perform one or more of the steps, tasks, operations, or processes of the hierarchical classification systems described herein, drivers 442 (e.g., a GUI driver), network transport protocols 444, and data 446 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A system, comprising:
   one or more wireless nodes of an asset type, each of the one or more wireless nodes of the asset type associated with a mobile asset;
   one or more wireless nodes of an infrastructure type, each of the one or more wireless nodes of the infrastructure type located in a designated space in an environment; and
   an interface map file loadable in a memory of a computing device and displayable by a client application executable on the computing device, the interface map comprising data corresponding to an interface map,
   wherein, when displayed by the client application on the computing device, the interface map comprises a graphical representation of the designated space and a graphical representation of the one or more wireless nodes of the infrastructure type at a location in the graphical representation that corresponds to a physical location of the infrastructure type of wireless tag, and
   wherein, the one or more wireless nodes of the asset type are configured to wirelessly communicate with the one or more wireless nodes of the infrastructure type.

2. The system of claim 1, wherein in response to receipt of an input at the location of one of the wireless nodes of the infrastructure type in the graphical representation of the designated space in the interface map, the client application executing on the computing device displays the description of the designated space.

3. The system of claim 2, wherein the description of the designated space comprises data received from the one of the wireless nodes of the infrastructure type or a description corresponding to data received from the one of the wireless nodes of the infrastructure type.

4. The system of claim 2, wherein the description of the designated space comprises data received from the one of the wireless nodes of the asset type or a description corresponding to data received from the one of the wireless nodes of the asset type.

5. The system of claim 1, further comprising:
   a server; and
   a gateway wireless node located in the environment, the gateway wireless node configured to wirelessly communicate with the one or more wireless nodes of the infrastructure type and communicate with the server;
   wherein the one or more wireless nodes of the infrastructure type comprise a wireless communication system for communicating with the gateway wireless node.

6. The system of claim 1, the one or more wireless nodes of the asset type comprising a wireless communication system of a type comprising one or more of a Bluetooth-based communications system, a Bluetooth Low Energy (BLE), a WiFi communications system, a Zigbee communications system, a Long Range (LoRa) based communications system, and a LoRaWAN communication system, a cellular communications system, and a satellite communications system.

7. The system of claim 1, further comprising:
   a server storing a database, the database comprising the interface map file;
   a client computing device operable to execute the client application and display the interface map, wherein the client computing device receives the interface map file from the server.

8. The system of claim 7, wherein the client computing device is one or more of a smartphone, laptop, a personal computer, and a tablet computer.

9. A method comprising:
   loading a map file of a physical environment in a memory of a computing device;
   displaying within a graphical user interface of a client software application executing on the computing device a map interface of the physical environment on the computing device based on the map file loaded in the memory, the map interface graphically representing the physical environment;
   receiving a user input in the map interface corresponding to a location in the physical environment;
   determining a location corresponding to the user input based on the received user input and based on data from the map file;
   receiving an identifier of a wireless node at the location in the physical environment corresponding to the user input; and
   associating the determined location with the identifier of the wireless node.

10. The method of claim 9, further comprising:
    displaying within the map interface, a graphical representation of the wireless node at a position in the map interface corresponding to the determined location of the wireless node.

11. The method of claim 9, wherein the displaying the map interface comprises displaying on the computing device features that correlate with corresponding physical infrastructure features in the physical environment.

12. The method of claim 9, further comprising, wherein the identifier of the wireless node is retrieved by scanning the wireless node with the computing device.

13. The method of claim 9, wherein the wireless node is installed at a time corresponding to a time of the association of the determined location with the identifier of the wireless node.

14. The method of claim 13, further comprising responsive to receiving the user input in the map interface, prompting a user to install the wireless node at the location in the physical environment corresponding to the received user input.

15. A method, comprising:
    loading a map file corresponding to a physical premises environment in a memory of a computing device;
    loading one or more requirements in the memory of the computing device for an installation of one or more wireless tags in the physical premises environment; and
    executing, by the computing device, a wireless tag installation simulation application program operable to automatically configure rooms and other defined spaces in a map interface, the map interface comprising a graphical representation of the physical premises environment, wherein
    the wireless tag installation simulation application program generates a proposed configuration of the one or more wireless tags in the physical premises environment according to the one or more requirements and data from the map file.

16. The method of claim 15, wherein the proposed configuration comprises at least the one or more wireless tags, a type of wireless tag for each of the one or more wireless tags, and a location of installation in the physical environment for each of the one or more wireless tags.

17. The method of claim 16, further comprising:

displaying, by the computing device, the proposed configuration of wireless tags in a map interface of a client software application, the map interface comprising a graphical representation of the physical premises environment and, for each of the one or more wireless tags, a graphical representation of the wireless tag at a position relative to the graphical representation corresponding to a location in the physical premises environment.

18. The method of claim 15, further comprising:

performing, by the wireless tag installation simulation application program, one or more design rules checks on the proposed configuration of the one or more wireless tags in the physical premises environment; and detecting, by the wireless tag installation simulation application program, any warnings, errors, or failures in the proposed configuration.

19. The method of claim 18, further comprising:

responsive to detecting an error in the proposed installation, editing, by the wireless tag installation simulation application program, the proposed configuration by the wireless tag installation simulation application program executing on the computing device; and responsive to the wireless tag installation simulation application program detecting no errors in the proposed installation, presenting, by the computing device, the proposed configuration as ready to be deployed in the physical premises environment.

20. The method of claim 15, further comprising:

instructing, by the computing device, a user to install wireless tags at locations corresponding to the proposed configuration.

* * * * *

UNITED STATES PATENT AND TRADEMARK OFFICE
CERTIFICATE OF CORRECTION

PATENT NO. : 11,657,250 B2  
APPLICATION NO. : 17/671518  
DATED : May 23, 2023  
INVENTOR(S) : Hendrik J Volkerink et al.

Page 1 of 1

It is certified that error appears in the above-identified patent and that said Letters Patent is hereby corrected as shown below:

On the Title Page

Item (72) In the Inventors list that currently reads:
"Hendrik J Volkerink, Palo Alto, CA (US); Ajay Khoche, West San Jose, CA (US); Scott Filler, Santa Clara, CA (US)".

The correct Inventors list should read:
-- Hendrik J Volkerink, Palo Alto, CA (US); Ajay Khoche, West San Jose, CA (US); Scott Filler, Santa Clara, CA (US); Rohit Govindbhai Chudasama, Fremont, CA (US) --.

Signed and Sealed this  
Twenty-third Day of December, 2025

John A. Squires  
*Director of the United States Patent and Trademark Office*